US012345002B1

(12) United States Patent
Ben Hamida

(10) Patent No.: US 12,345,002 B1
(45) Date of Patent: Jul. 1, 2025

(54) SMART SPEED BUMP AND METHODS FOR ENERGY GENERATION

(71) Applicant: IMAM MOHAMMAD IBN SAUD ISLAMIC UNIVERSITY, Riyadh (SA)

(72) Inventor: Mohamed Bechir Ben Hamida, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/007,066

(22) Filed: Dec. 31, 2024

(51) Int. Cl.
*F03B 13/00* (2006.01)
*E01F 9/529* (2016.01)
*F04B 19/04* (2006.01)

(52) U.S. Cl.
CPC .............. *E01F 9/529* (2016.02); *F03B 13/00* (2013.01); *F04B 19/04* (2013.01)

(58) Field of Classification Search
CPC ............ E01F 9/529; F03B 13/00; F04B 19/04
See application file for complete search history.

(56) References Cited

U.S. PATENT DOCUMENTS 4,173,431 A * 11/1979 Smith ..................... F04B 35/00 417/229
4,339,920 A * 7/1982 Le Van ..................... F03G 7/08 60/413

(Continued)

FOREIGN PATENT DOCUMENTS

GB 2461860 A 1/2010
IN 416798 B 1/2023
KR 10-20120071215 A 7/2012

OTHER PUBLICATIONS

Hatem Hadi Obeid, et al., "Design and Motion Modeling of an Electromagnetic Hydraulic Power Hump Harvester", Advances in Mechanical Engineering, vol. 6, Jan. 1, 2014, pp. 1-11. 11 pages.

(Continued)

*Primary Examiner* — Tulsidas C Patel
*Assistant Examiner* — Thomas K Quigley
(74) *Attorney, Agent, or Firm* — Oblon, McClelland, Maier & Neustadt, L.L.P.

(57) ABSTRACT

An energy generating speed bump assembly and a method for generating electrical energy therewith are described which integrate mechanical shock absorption with hydraulic power generation in a subterranean housing. The assembly includes a speed bump mounted within a channel configured for controlled vertical displacement. A helical compression spring connects the speed bump to a piston oil pump, converting vehicular kinetic energy into hydraulic pressure through a coordinated mechanical-hydraulic interface. The assembly includes a main oil reservoir and a compressed oil tank receiving hydraulic pressure to generate pressurized hydraulic fluid. The pressurized hydraulic fluid drives an oil turbine coupled to an electrical generator, facilitating power generation from vehicular traffic. The modular design of the assembly facilitates standardized installation within conventional roadway infrastructure. This integrated approach simultaneously provides traffic speed regulation and renewable energy generation while minimizing vehicular impact through controlled deceleration characteristics.

15 Claims, 8 Drawing Sheets

(56) References Cited

U.S. PATENT DOCUMENTS

| | | | | | |
|---|---|---|---|---|---|
| 4,418,542 | A * | 12/1983 | Ferrell | F04B 9/00 60/668 |
| 5,634,774 | A * | 6/1997 | Angel | F03G 7/083 417/229 |
| 6,091,159 | A * | 7/2000 | Galich | F03G 7/085 290/1 R |
| 6,172,426 | B1 * | 1/2001 | Galich | F03G 7/085 290/1 R |
| 6,376,925 | B1 * | 4/2002 | Galich | F03G 7/085 290/1 R |
| 6,858,952 | B2 * | 2/2005 | Gott | F03G 7/08 290/1 R |
| 6,949,840 | B2 * | 9/2005 | Ricketts | F03G 7/085 290/1 R |
| 7,541,684 | B1 * | 6/2009 | Valentino | H02J 5/00 290/1 R |
| 7,629,698 | B2 * | 12/2009 | Horianopoulos | F03G 7/085 290/1 R |
| 8,164,204 | B2 * | 4/2012 | Jang | F03G 7/083 290/1 R |
| 8,461,701 | B2 * | 6/2013 | Kennedy | F03G 7/083 290/1 R |
| 8,661,806 | B2 * | 3/2014 | Hendrickson | F15B 13/04 60/413 |
| 8,680,697 | B2 * | 3/2014 | Alqanee | G16B 30/00 290/1 R |
| 8,791,584 | B2 * | 7/2014 | Sieger | F03G 7/08 290/1 R |
| 8,928,160 | B2 * | 1/2015 | Jang | F03G 7/083 290/1 R |
| 10,233,911 | B2 * | 3/2019 | Shani | F03G 7/083 |
| 10,954,926 | B2 * | 3/2021 | Duarte | F03G 7/083 |
| 11,677,270 | B2 * | 6/2023 | Byun | H02J 50/10 307/104 |
| 11,764,645 | B2 * | 9/2023 | Giannotta | H02K 7/1853 404/71 |
| 2007/0085342 | A1 | 4/2007 | Horianopoulos et al. | |
| 2008/0150297 | A1 * | 6/2008 | Shadwell | H02K 7/1853 310/20 |
| 2009/0315334 | A1 * | 12/2009 | Chen | E01C 9/00 290/1 A |
| 2011/0148121 | A1 * | 6/2011 | Kenney | F03G 7/083 290/1 R |
| 2011/0187125 | A1 * | 8/2011 | Jang | F03G 7/083 290/1 C |
| 2012/0211996 | A1 * | 8/2012 | Jang | F03G 7/083 290/1 R |
| 2015/0115615 | A1 * | 4/2015 | Jang | F03G 7/083 290/1 C |
| 2023/0243344 | A1 * | 8/2023 | Nigg | F03G 7/083 290/1 E |

OTHER PUBLICATIONS

Gonzalo del Castillo-Garcia, et al., "Energy harvesting from vehicular traffic over speed bumps: a review", Proceedings of the Institution of Civil Engineers—Energy, vol. 171, Issue 2, May 2018, pp. 58-69, 2 Pages. Abstract page.

* cited by examiner

SMART SPEED BUMP AND METHODS FOR ENERGY GENERATION

BACKGROUND

Technical Field

The present disclosure is directed to energy harvesting systems in transportation infrastructure, and more particularly to hydraulically actuated energy generation devices integrated with vehicular traffic control elements. Specifically, the present disclosure describes an energy generating speed bump assembly and a method for generating electrical energy therewith that combines shock absorption functionality with hydroelectric power generation capabilities.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Speed bumps and similar traffic calming devices are widely employed in urban environments to regulate vehicle speeds and enhance pedestrian safety, particularly in school zones, residential areas, and high-traffic intersections. These devices are utilized in traffic management by physically compelling vehicles to reduce speed through vertical displacement. These conventional devices, while being generally effective at speed reduction, have certain limitations including increased mechanical stress on vehicles, elevated fuel consumption, and lost energy dissipation. The abrupt vertical displacement forces vehicles to rapidly decelerate and accelerate, resulting in increased mechanical stress on vehicle components, increased fuel consumption, and passenger discomfort. Furthermore, the kinetic energy dissipated during vehicle passage is typically lost as heat and vibration, representing a missed opportunity for energy recovery.

Various attempts have been made to address these limitations through the development of energy-harvesting speed bumps. Some known systems have employed mechanical systems such as rack-and-pinion mechanisms or rotating poles to convert vehicular kinetic energy into electrical power. Other approaches have utilized hydraulic circuits to capture and convert the energy, though these systems often lack efficient energy storage capabilities and require complex external power management infrastructure. Many systems rely on basic mechanical or hydraulic mechanisms that cannot effectively store energy without expensive battery systems. Additionally, known systems often fail to adequately address the shock absorption needs of vehicles, potentially contributing to increased wear and maintenance costs. Furthermore, existing systems generally require extensive modification of roadway infrastructure and separate housing for power generation equipment, complicating installation and maintenance procedures.

KR20120071215A describes a speed bump system incorporating uneven sections installed for reducing vehicle speed on roadways. The system includes a speed bump connected to a spring mechanism, with a piston head and cylinder assembly linked to a compression tank. When a vehicle engages the system, the compressed liquid activates a fluid turbine connected to a generator through a control valve arrangement. This system implements basic plate sections. This reference does not describe an integrated speed bump assembly with coordinated mechanical and hydraulic subsystems contained in a housing for subterranean installation.

US20070085342 describes a traffic-actuated power generating apparatus incorporating an energy collection device within a roadway-supported pad. The system utilizes a piston-cylinder arrangement with a spring mechanism, connecting to a low-pressure fluid supply reservoir and high-pressure air-over oil accumulator for power generation. This system employs individual piston units with separate rounded surfaces. This reference does not describe an integrated speed bump assembly with coordinated mechanical and hydraulic subsystems contained in a housing for subterranean installation.

GB2461860A describes a ramp plate system depressed by vehicular traffic to drive a hydraulic piston along a cylinder, operating an output shaft through meshing gear teeth. The system employs return springs to restore the ramp position and includes embodiments utilizing air compression for cylinder actuation. This reference does not describe an integrated speed bump assembly with coordinated mechanical and hydraulic subsystems contained in a housing for subterranean installation.

IN416798B describes a power generation system utilizing speed breakers with a hydraulic circuit design. The system pressurizes hydraulic fluid through platform compression, directing the fluid to accumulators and a hydraulic motor for power generation. The system incorporates dual hydraulic pumps connected through a hydraulic tube to a reservoir and multiple accumulators. This reference does not describe an integrated speed bump assembly with coordinated mechanical and hydraulic subsystems contained in a housing for subterranean installation.

Each of the aforementioned references suffers from one or more drawbacks hindering their adoption, such as inadequate shock absorption leading to increased vehicle wear, inefficient energy conversion due to mechanical losses, limited energy storage capabilities requiring additional battery systems, complex external power management infrastructure requirements, and challenging installation and maintenance procedures. Accordingly, it is one object of the present disclosure to provide systems and methods which maximize energy recovery while minimizing vehicle impact, operate reliably under various traffic conditions, and integrate with existing roadway infrastructure. Additionally, existing systems often require substantial modifications to roadway infrastructure and separate housing structures for power generation equipment, increasing installation complexity and costs. Accordingly, it is one object of the present disclosure to provide methods and systems for converting vehicular kinetic energy into electrical power through an integrated speed control and energy generation assembly that combines shock absorption capabilities with efficient hydraulic power generation in a unified, self-contained system suitable for standard roadway installation.

SUMMARY

In an exemplary embodiment, an energy generating speed bump assembly is described, comprising: a housing including a top surface, a bottom surface, a first wall, a second wall opposite the first wall, a third wall connected to the first wall and the second wall, wherein the third wall is perpendicular to the first wall, and a fourth wall connected to the first wall and the second wall and opposite to the third wall, wherein the housing includes three sections configured as an upper section adjoining the top surface, a middle section below the upper section and a lower section below the middle section, wherein the housing is mounted within a trench in a roadway; a speed bump having a tapered side surface, a flat bottom surface, an arcuate top surface and an arcuate side surface, wherein the arcuate top surface is configured to extend from an upper end of the tapered side surface to the arcuate side surface, and the arcuate side surface is configured to extend from the arcuate top surface to the flat bottom surface; a channel located within the housing, the channel having an opening configured to receive the flat bottom surface, the tapered side surface and arcuate side surface of the speed bump, wherein the channel has a lower surface and tapered sides, wherein an angle of a first tapered side of the channel is configured to match an angle of the tapered side surface of the speed bump; a spring having a top end mounted to the flat bottom surface of the speed bump, wherein the spring is configured to coil in response to a depression of the speed bump into the channel and to uncoil and return the speed bump to an undepressed configuration in which the arcuate top surface of the speed bump extends above a surface of the roadway; a piston oil pump including a cylinder, a piston rod and a piston head configured to move within the cylinder, wherein a first end of the piston rod is mounted to the flat bottom surface of the speed bump and a second end of the piston rod is connected to the piston, wherein a bottom end of the spring is mounted to an indented ring on an outside surface of the piston head; a main oil reservoir connected to piston oil pump, wherein oil in the main oil reservoir is at atmospheric pressure, wherein the piston oil pump is configured to pump oil from the cylinder into the main oil reservoir when the piston head is depressed by the speed bump and withdraw oil from the main oil reservoir when the spring uncoils and returns the speed bump to the undepressed configuration; a compressed oil tank connected to the main oil reservoir and to the piston oil pump, wherein the compressed oil tank is configured to receive oil from the main oil reservoir when the piston head is depressed within the piston oil pump; an oil turbine connected to the compressed oil tank, wherein the oil turbine is configured receive a stream of compressed oil when the piston head is depressed within the piston oil pump, wherein the stream of compressed oil is configured to rotate a turbine shaft of the oil turbine; and an electrical generator connected to the turbine shaft, wherein the electrical generator is configured to generate electricity when the turbine shaft is rotated by the stream of compressed oil.

In another exemplary embodiment, a method for generating electrical energy with an energy generating speed bump assembly, comprising: compressing an energy generating speed bump by driving an automobile over an arcuate top surface of the energy generating speed bump; compressing a piston rod connected to a piston within a piston cylinder of a piston oil pump connected to a flat bottom surface of the speed bump; pumping oil from the piston cylinder into a compressed oil tank connected to the piston oil pump; ejecting a compressed oil stream from the compressed oil tank into a turbine; receiving, into the turbine the compressed oil stream; rotating a turbine shaft of the oil turbine with the compressed oil stream; and generating, by an electrical generator connected to the turbine shaft, electricity when the turbine shaft is rotated.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
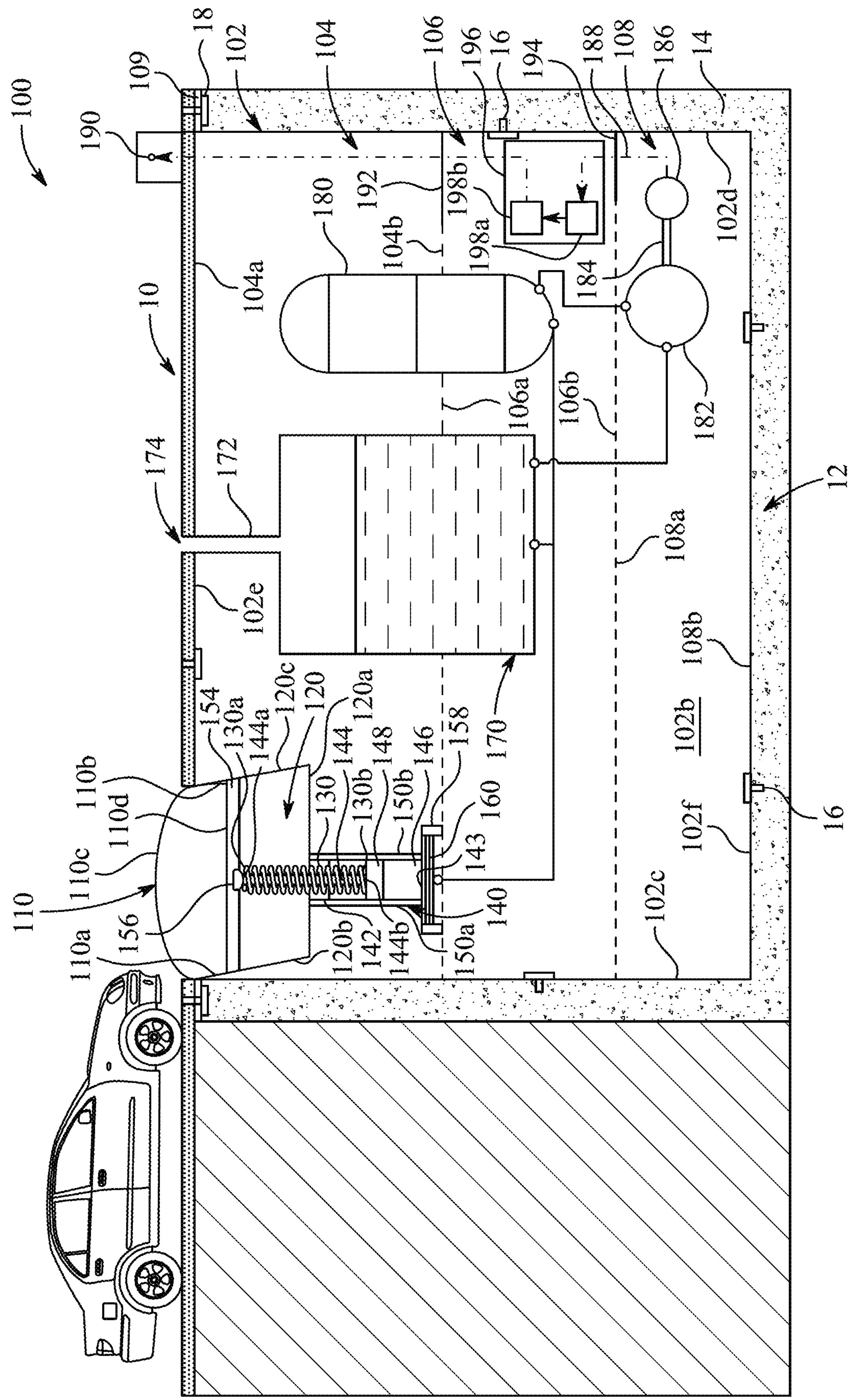
FIG. 1 is an exemplary diagrammatic side illustration of an energy generating speed bump assembly showing relative positioning of internal components and configuration thereof, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

Aspects of this disclosure are directed to an energy generating speed bump assembly and a method for generating electrical energy using the energy generating speed bump assembly from vehicular traffic through a coordinated mechanical and hydraulic system. The energy generating speed bump assembly and the method of the present disclosure address the aforementioned limitations through integration of hydraulic power generation with shock absorption functionality in a modular, self-contained unit designed for sub-roadway installation. The energy generating speed bump assembly integrates traffic control functionality with renewable energy generation, providing both vehicle speed regulation and electrical power production through a unified design. The energy generating speed bump assembly converts the mechanical energy of passing vehicles into stored hydraulic energy, which is subsequently transformed into electrical power through a carefully engineered power generation subsystem.

Referring to FIG. 1, illustrated is a diagram of an energy generating speed bump assembly (as represented by reference numeral 100) for installation within a roadway 10. The energy generating speed bump assembly 100 provides sustainable urban infrastructure technology, combining multiple engineering disciplines to address both traffic management and energy generation requirements. The energy generating speed bump assembly 100 employs an integrated approach that merges mechanical shock absorption, hydraulic power transmission, and electrical generation within a single, modular unit designed for simplified installation and maintenance. The energy generating speed bump assembly 100 of the present disclosure enables efficient energy harvesting from vehicular traffic while maintaining effective speed control functionality, suitable for deployment in various urban environments including school zones, commercial areas, and residential streets.

Figure 2:
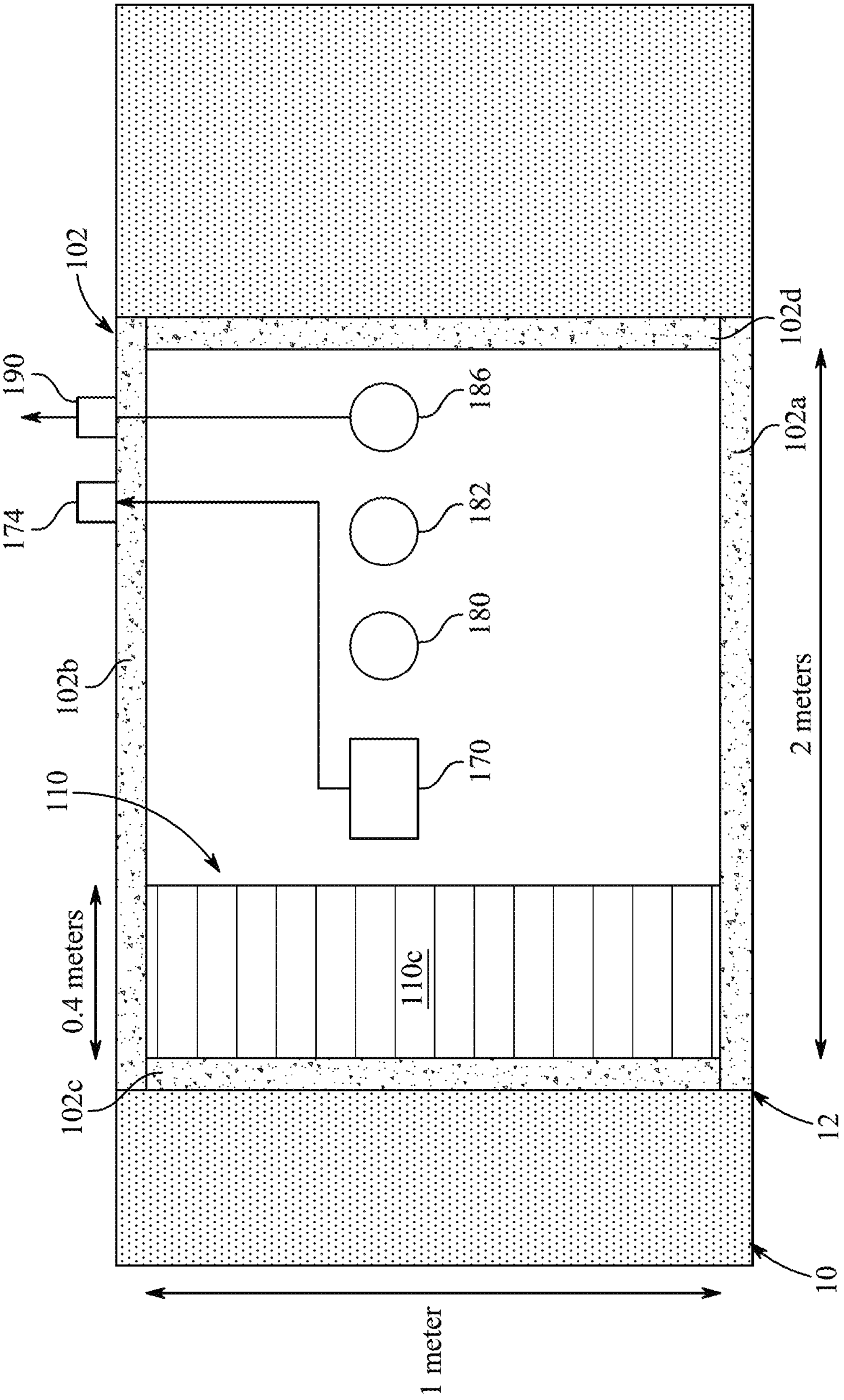
FIG. 2 is an exemplary top perspective view of the energy generating speed bump assembly, according to certain embodiments.

As illustrated in FIG. 1 and FIG. 2 in combination, the energy generating speed bump assembly 100 includes a housing 102. The housing 102 is configured for subterranean installation. The housing 102 is designed to contain an integrated system of mechanical, hydraulic, and electrical components for converting vehicular kinetic energy into electrical power. Herein, the housing 102 includes a first wall 102*a* (generally represented in FIG. 2, from a top view, a second wall 102*b* opposite the first wall 102*a* (102*b* shown as underscored in FIG. 1, as it is the other side of the housing 102 from 102*a*), a third wall 102*c* connected to and perpendicular to the first wall 102*a* and the second wall 102*b*, and a fourth wall 102*d* connected to the first wall 102*a* and the second wall 102*b* and opposite the third wall 102*c*. The housing 102 also includes a top surface 102*e* and a bottom surface 102*f*. The walls 102*a*-102*d* along with the top surface 102*e* and the bottom surface 102*f* collectively define an enclosure for the housing 102 for containing and supporting various components utilized in the operation of the energy generating speed bump assembly 100.

Also, as shown, the housing 102 is subdivided into three sections configured as an upper section 104 adjoining the top surface 102*e*, a middle section 106 below the upper section 104, and a lower section 108 below the middle section 106. Herein, the upper section 104 includes a top surface 104*a* and a bottom surface 104*b*, the middle section 106 includes a top surface 106*a* and a bottom surface 106*b*, and the lower section 108 includes a top surface 108*a* and a bottom surface 108*b*. The top surface 106*a* of the middle section 106 adjoins the bottom surface 106*b* of the upper section 104 and the bottom surface 106*b* of the middle section 106 adjoins the top surface 108*a* of the lower section 108. In the present configuration, the upper section 104 contains the primary mechanical components, while the middle section 106 contains the hydraulic fluid management systems, and the lower section 108 contains the power generation equipment (as discussed below in more detail).

Further, as depicted in FIG. 1 and FIG. 2, the housing 102 is mounted within a trench 12 in a roadway 10. For purposes of the present disclosure, the housing 102 is shaped to be box-like, however, it may be contemplated that the housing 102 may be configured in other suitable shapes without departing from the spirit and the scope of the present disclosure. In an example, the trench 12 has a length (across the roadway) in a range of about 2.5 m to about 3.7 m, a width (along the roadway) in a range of about 1.65 m to 2.0 m and a depth (into the roadway) in a range of about 0.95 m to about 1 m. Similarly, the housing 102 has a length in a range of about 2.5 meters to about 3.5 m (i.e., between the first wall 102*a* and the second wall 102*b*), a width in a range of about 1.6 m to about 1.95 meters in width (i.e., between the third wall 102*c* and the fourth wall 102*d*), and a depth in a range of about 1.65 m to 2.0 m and a depth (i.e., between the top surface 102*e* and the bottom surface 102*f*). In general, the housing 102 is mounted within the trench 12 with tight dimensional tolerances for proper installation thereof.

In an aspect of the present disclosure, the trench 12 in the roadway 10 is lined with reinforced concrete (as represented by reference numeral 14). In particular, the installation of the energy generating speed bump assembly 100 requires site preparation and implementation procedures. The installation begins with the excavation of the trench 12 in the roadway 10, with said dimensional specifications. The trench 12 receives the reinforced concrete 14 in the form of a liner, which may incorporate steel reinforcement bars. The concrete surface undergoes a shot-blast treatment to achieve a smooth surface profile, ensuring optimal adhesion for subsequent mounting operations. In an example, the housing 102 walls 102*a*-102*d* and the bottom surface 102*f* are supported by the trench 12 fabricated from reinforced composite material providing sufficient compressive strength, for withstanding substantial compressive loads. Herein, the housing 102 is mounted within the trench 12 by anchors 16 bolted to the reinforced concrete 14. In an example, the anchors 16 may include chemical anchor bolts installed with a specified torque for proper installation.

In a non-limiting example, the housing 102 is fabricated from fiber-reinforced rubber.

In another non-limiting example, the housing 102 is fabricated from polyurethane.

In another non-limiting example, the housing 102 is fabricated from stainless steel.

It may be seen that a surface of the roadway 10 is disposed over the top surface 102*e* of the housing 102 (on the outer surface of the top surface 104*a* of the upper section 104). In an aspect of the present disclosure, the top surface 102*e* of the housing 102 includes a lip 109 around an outer edge of the top surface 102*e* and over the concrete walls 14 of the trench 12. Herein, the lip 109 includes bolt holes configured to receive anchor bolts 18 which secure the housing 102 to the surface of the roadway 10. The bolt holes may be arranged at regular intervals and sized for receiving anchor bolts 18. In an example, the lip 109 is fabricated from stainless steel with thickness to match thickness of the roadway 10 to be flush therewith. In some examples, a sealant sheet with high hardness may be provided over the lip 109, or over the entire top surface 102*e* of the housing 102, to provide environmental isolation between the housing 102 and the roadway 10.

Further, the energy generating speed bump assembly 100 includes a speed bump 110 mounted within a tapered channel 120 in the upper section 104 of the housing 102. The speed bump 110 includes a tapered side surface 110*a*, a flat bottom surface 110*d*, an arcuate top surface 110*c*, and an arcuate side surface 110*b*. Herein, the tapered side surface 110*a* is inclined at an angle of about 10 degrees relative to vertical, facilitating smooth engagement with a channel structure in the housing 102 supporting the speed bump 110. The flat bottom surface 110*d* extends the full length of the speed bump 110 and provides a stable mounting surface for the internal mechanisms. The arcuate top surface 110*c* is configured to extend from an upper end of the tapered side surface 110*a* to the arcuate side surface 110*b*. The arcuate side surface 110*b* is configured to extend from the arcuate top surface 110*c* to the flat bottom surface 110*d*, forming a continuous curved profile.

In an example, the speed bump 110 has a length in a range of about 2.5 meters to about 3.5 m and is about 0.4 meters in width, with a maximum height of about 0.12 meters from the roadway surface at the peak of the arcuate top surface 110*c*. The given dimensions, specifically the length selected from a range of about 2.5 meters to about 3.5 m, provides that the speed bump 110 extends across at least a lane of the roadway, wherein the length of the lane of the roadway is about about 2.5 meters to about 3.7 m. It may be appreciated that in the illustration of FIG. 2, the speed bump 110 is shown to extend across a lane of the roadway. These dimensions enable the speed bump 110 to engage a single set of vehicle tires at a time, ensuring controlled deceleration while maximizing energy harvesting potential. The given length allows complete engagement of typical vehicle axle configurations, promoting smooth transition and consistent energy transfer during vehicle passage. The tapered side surface 110*a* of the speed bump 110 maintains a ten degree angle relative to vertical, enabling controlled engagement and disengagement of vehicle tires during passage. This angle minimizes impact forces on vehicle suspension components while maintaining efficient energy transfer to the internal mechanisms. The tapered geometry also helps to reduces wear on both vehicle tires and the speed bump 110 through gradual load application and release.

The arcuate top surface 110*c* of the speed bump 110 follows a geometric curve with a 2-meter radius relative to an imaginary center, providing a smooth vertical displacement profile for passing vehicles. This curvature provides controlled deceleration characteristics while maximizing the vertical force component available for energy harvesting. The arcuate side surface 110*b* continues this curved profile to the flat bottom surface 110*d*, completing the geometric transition that enables smooth vehicle passage while maintaining structural integrity of the speed bump 110. Also, the flat bottom surface 110*d* of the speed bump 110 maintains dimensional tolerances with a flatness deviation not exceeding 0.5 millimeters across the length of the speed bump 110. This surface provides uniform contact with the supporting channel structure and mounting points (as discussed later) for internal mechanical components. The entire speed bump 110 assembly maintains consistent mechanical properties and dimensional stability through reinforcement elements distributed throughout the structure according to predicted load patterns and stress concentrations.

In an example configuration, the speed bump 110 incorporates a multi-layer construction configured for durability and efficient energy transfer. The speed bump 110 may have an outer layer made of high-strength rubberized composite material incorporating UV stabilizers for environmental resistance. This outer layer provides high traction characteristics and impact resistance for sustained operation under repeated vehicle loading. The speed bump 110 may also have a middle core layer with steel reinforcement or aluminum alloy framework, providing structural rigidity and ensuring dimensional stability under dynamic loading conditions. The speed bump 110 may further have a bottom layer incorporating solid composite material with an anti-slip coating applied to the flat bottom surface 110*d*, preventing sideways movement between the speed bump 110 and the supporting channel structure.

The energy generating speed bump assembly 100 further includes a channel 120 located within the housing 102. The channel 120 is formed within the upper section 104 of the housing 102 and is configured to receive the lower portion of the speed bump 110. The channel 120 is in the form of a recessed structure within the housing 102, configured to accommodate vertical displacement of the speed bump 110 and associated mechanical components. As shown in the cross-section of FIG. 1, the side cross-section of the channel 120 has the shape of a parallelogram, having tapered sides to accommodate the speed bump. The tapered sides deviate from the vertical by about 10 degrees. A steel mounting plate 154 is connected to the underside of the speed bump 110, a U-shaped bracket 156 is connected to the steel mounting plate 154 and a top portion of a piston rod 144 and a top end 130*a* of the helical compression spring 130. The channel 120 has an opening configured to receive the flat bottom surface 110*d*, the tapered side surface 110*a*, and arcuate side surface 110*b* of the speed bump 110. In particular, the channel 120 has a lower surface 120*a* and tapered sides, including a first tapered side 120*b* and a second tapered side 120*c*. Herein, an angle of the first tapered side 120*b* of the channel 120 is configured to match an angle of the tapered side surface 110*a* of the speed bump 110. The lower surface 120*a* of the channel 120 provides a flat base configured for secure mounting of mechanical components therein. The first tapered side 120*b* and second tapered side 120*c* of the channel 120 provide lateral support and guidance for the speed bump 110 during vertical displacement.

The matching angle between the first tapered side 120*b* and the tapered side surface 110*a* of the speed bump 110 ensures alignment throughout the compression and release cycle. The tapered sides 120*b*, 120*c* extend upward from the lower surface 120*a* and are fabricated from high-strength composite panels configured to withstand repeated dynamic loads. The channel 120 maintains the speed bump 110 within defined vertical movement limits while preventing lateral displacement during operation. The rectangular cross-section of the channel 120 enables secure containment of the speed bump 110 and associated spring assembly (discussed in proceeding paragraphs) throughout the operational cycle. In some examples, the lower surface 120*a* incorporates drainage outlets (not shown) positioned at strategic locations to prevent water accumulation within the channel 120. These drainage outlets maintain operation of the energy generating speed bump assembly 100 under varying weather conditions. An opening is provided at a center of the lower surface 120*a* of the channel to accommodate the movement of the helical compression spring 130 and piston rod 144 as the speed bump 110, piston rod 144 and steel mounting plate 154 move downward due to a compression of the speed bump by an automobile tire.

In an example, the channel 120 measures about 2.5 meters in length to match dimensions of the speed bump 110, with a width of about 0.45 meters providing 0.025 meters of clearance on each side of the speed bump 110. The channel 120 and piston assembly extend to a depth of about 0.3 meters, providing sufficient space for vertical movement of the speed bump 110 and the support of the cylinder 142. The channel 120 is fabricated from hard-anodized aluminum with surfaces maintaining a flatness with low tolerance. In some examples, the channel 120 may include guide rails (not shown) to support vertical movement of the speed bump 110.

As shown in FIG. 1, a top of the channel 120 is configured to align with a top edge of the trench 12 in the roadway 10. This alignment ensures integration of the channel 120 with the surrounding surface of the roadway 10 while maintaining proper vertical positioning of the speed bump 110 in both compressed and uncompressed states. In an aspect, the trench 12 in the roadway 10 is lined with reinforced concrete configured to support the housing 102 and channel 120 and prevent deformation of the trench 12 under heavy loads. Such reinforced concrete liner extends continuously along the length and width of the trench 12, creating a foundation for the housing 102 and channel 120. The reinforced concrete liner distributes vehicle loads from the channel 120 to the surrounding roadway structure while maintaining dimensional stability of the trench 12. In particular, this configuration provides resistance to both vertical and lateral loads, preventing deformation of the trench 12 under heavy vehicle traffic and providing sustained alignment between the channel 120 and the surface of the roadway 10.

The energy generating speed bump assembly 100 further includes a spring 130. In aspects of the present disclosure, the spring 130 is a helical compression spring (with the two terms being interchangeably used hereinafter). The helical compression spring 130 is placed beneath the speed bump 110 in the upper section 104. The helical compression spring 130 includes a top end 130*a* and a bottom end 130*b*. The top end 130*a* is mounted to the flat bottom surface 110*d* of the speed bump 110. In an aspect, the helical compression spring 130 has an uncompressed height of about 0.2 m and a compressed height of about 0.15 m. In an example, the helical compression spring 130 is fabricated from stainless steel with a wire diameter of about 0.1 meters. Further, the helical compression spring 130 is configured to deliver a spring rate of about 20 kN/m. In some examples, the helical compression spring 130 may incorporate a base coating with an epoxy finish to provide corrosion resistance.

The helical compression spring 130 functions through a defined compression cycle coordinated with vertical displacement of the speed bump 110. The helical compression spring 130 is configured to coil in response to depression of the speed bump 110 into the channel 120 (as illustrated in FIG. 2, discussed later) and to uncoil and return the speed bump 110 to an undepressed configuration (as illustrated in FIG. 1) in which the arcuate top surface 110*c* of the speed bump 110 extends above the surface of the roadway 10. When a vehicle engages the speed bump 110, the helical compression spring 130 undergoes controlled coiling as the speed bump 110 descends into the channel 120. The spring rate of 20 kN/m ensures regulated compression through the full stroke range. Upon release of the vehicle load, the helical compression spring 130 uncoils through a controlled expansion phase, generating a return force of 20 kN. This expansion force drives the speed bump 110 upward to the undepressed configuration, where the arcuate top surface 110*c* extends a predetermined distance of about 0.12 meters above the surface of the roadway 10. The complete compression and return cycle may occur over an interval of about 0.5 to about 1.0 seconds.

The energy generating speed bump assembly 100 further includes a piston oil pump 140. The piston oil pump 140 represents the primary energy conversion mechanism of the energy generating speed bump assembly 100. As illustrated, the piston oil pump 140 includes a cylinder 142, a piston rod 144, and a piston head 148 configured to move within the cylinder 142. The piston rod 144 extends from the top of the piston head 148 disposed within the cylinder 142. The piston rod 144 has a first end 144*a* and a second end 144*b*. The first end 144*a* of the piston rod 144 is mounted to the flat bottom surface 110*d* of the speed bump 110, and the second end 144*b* of the piston rod 144 is connected to the piston head 148. The bottom end 130*b* of the helical compression spring 130 is mounted to an indented ring on an outside surface of the piston head 148. Such mounting with the indented ring supports connection between the helical compression spring 130 and the piston head 148, providing that the helical compression spring 130 does not slip off from its mounting with the piston head 148 in the piston oil pump 140.

In an aspect of the present disclosure, the helical compression spring 130 is configured to encircle the piston rod 144. Herein, the helical compression spring 130 is seated between a top of the piston head 148 and the flat bottom surface 110*d* of the speed bump 110. The helical compression spring 130 maintains concentric alignment with the piston rod 144 through such mounting configuration. The helical compression spring 130 encircles the full length of the piston rod 144, with the top end 130*a* seated on the flat bottom surface 110*d* of the speed bump 110 and the bottom end 130*b* engaging with the indented ring in the outer circumference of the piston head 148, providing a stable support structure for vertical motion. With this configuration, the helical compression spring 130 maintains spacing between the speed bump 110 and the cylinder 142 throughout the compression cycle. The concentric arrangement ensures uniform load distribution and prevents binding of the piston rod 144 during operation.

Further, in an aspect of the present disclosure, the energy generating speed bump assembly 100 includes vertical guide rails 150*a*, 150*b* configured to surround the piston oil pump 140 and prevent lateral displacement of the piston 146. In particular, the piston oil pump 140 incorporates the vertical guide rails 150*a*, 150*b* positioned to surround the cylinder 142. The vertical guide rails 150*a*, 150*b* prevents lateral displacement of the piston head 148 within the cylinder 142 while enabling free vertical motion during compression and return cycles. The guide rails 150*a*, 150*b* may be fabricated from hardened steel with a polytetrafluoroethylene (PTFE) coating to provide a coefficient of friction below 0.05. Each guide rail measures 0.02 meters by 0.02 meters in cross-section and extends through the full vertical travel range of the cylinder 142. In some examples, the vertical guide rails 150*a*, 150*b* may incorporate linear bearings for maintaining positional alignment throughout range of stroke of the piston head 148.

The energy generating speed bump assembly 100 further includes a steel mounting plate 154 located on the flat bottom surface 110*d* of the speed bump 110. The steel mounting plate 154 matches the width of the speed bump 110, and measures about 0.4 meters by 0.15 meters with a thickness of 0.01 meters. The steel mounting plate 154 is fabricated from high-strength stainless steel to resist wear and deformation under repeated impact. Such design and configuration of the steel mounting plate 154 provide sustained structural integrity under cyclic loading conditions.

The energy generating speed bump assembly 100 also includes a U-shaped bracket 156 connected to the steel mounting plate 154. The U-shaped bracket 156 may be manufactured from high-strength aluminum alloy. Herein, the first end 144*a* of the piston rod 144 is connected to the U-shaped bracket 156. Such connection may be made using bolts arranged in a specific pattern for uniform load distribution. The U-shaped bracket 156 facilitates slight angular adjustments with the piston rod 144 to accommodate minor misalignments and ensure smooth operation. In some examples, the U-shaped bracket 156 may include shock-absorbing washers (not shown) positioned between its connection with the steel mounting plate 154 to provide vibration isolation.

The energy generating speed bump assembly 100 further includes a cylinder mounting bracket 158 attached by bolts to the bottom surface 104*b* of the upper section 104. In an example, the cylinder mounting bracket 158 is fabricated from steel plate with a thickness of 0.015 meters and incorporates reinforcements for enhanced structural rigidity. Herein, the cylinder mounting bracket 158 is configured to hold a base 143 of the cylinder 142 to the bottom surface 104*b* of the upper section 104. The cylinder mounting bracket 158 is configured to hold the base 143 of the cylinder 142 to the bottom surface 104*b* of the upper section 104 while maintaining precise alignment with the vertical guide rails 150*a*, 150*b*. The energy generating speed bump assembly 100 further includes a plurality of rubber damping pads 160 placed between the base 143 of the cylinder 142 and the cylinder mounting bracket 158. Herein, the plurality of rubber damping pads 160 are configured to absorb vibrations and prevent mechanical wear of the cylinder 142. The rubber damping pads 160 provides vibration attenuation while maintaining positional stability of the cylinder 142. The rubber damping pads 160 may be manufactured from synthetic rubber compound, configured to maintain vibration isolation effectiveness across frequencies. In an example, each damping pad 160 measures 0.05 meters in diameter with a thickness of 0.012 meters, positioned at locations to absorb operational vibrations and prevent mechanical wear of the cylinder 142.

Further, as illustrated in FIG. 1, the middle section 106 of the housing 102 contains the hydraulic fluid management system. In the present configuration, the energy generating speed bump assembly 100 includes a main oil reservoir 170 connected to the piston oil pump 140. The main oil reservoir 170 may be connected to the piston oil pump 140 through standardized hydraulic fittings. The main oil reservoir 170 is situated within the middle section 106 of the housing 102, positioned below the piston oil pump 140. The main oil reservoir 170 maintains oil at atmospheric pressure through a dedicated ventilation system (as discussed in proceeding paragraphs) and serves as a low-pressure storage vessel for the hydraulic circuit. The middle section may be positioned at a width greater than about 0.4 m, to avoid interference with the speed bump and channel, and the main oil reservoir 170 and a compressed oil tank 180 may extend into the upper section. In an example, a top surface of the main oil reservoir 170 is positioned approximately 0.1 meters below the surface of the roadway 10. This arrangement makes best use of the available vertical space and aligns with the functional design of the system, ensuring efficient integration of the hydraulic components while maintaining ease of maintenance. It may be understood that the incorporated drawings may not illustrate relative positioning of the various components accurately, including that of the main oil reservoir 170, and these illustrations are exemplary only for understanding connections between the various components.

Herein, the piston oil pump 140 is configured to pump oil 146 from the cylinder 142 into the main oil reservoir 170 when the piston head 148 is depressed by the speed bump 110 and withdraw oil from the main oil reservoir 170 when the helical compression spring 130 uncoils and returns the speed bump 110 to the undepressed configuration. The piston oil pump 140 operates in a defined hydraulic cycle coordinated with the vertical displacement of the speed bump 110. When the piston head 148 undergoes downward displacement within the cylinder 142 due to compression of the speed bump 110, the piston oil pump 140 forces oil 146 from the cylinder 142 into the main oil reservoir 170. This fluid transfer occurs through hydraulic lines connecting the cylinder 142 directly to the main oil reservoir 170. During the return phase, as the helical compression spring 130 uncoils and returns the speed bump 110 to the undepressed configuration, the upward motion of the piston head 148 creates a pressure differential that withdraws oil from the main oil reservoir 170 back into the cylinder 142. The positioning of the main oil reservoir 170 within the middle section 106 further facilitates gravity-assisted return flow.

In aspects of the present disclosure, the energy generating speed bump assembly 100 includes an air pipe 172 connected to an air vent 174 positioned at a top surface of the main oil reservoir 170. Herein, the air pipe 172 is configured to eject air from the main oil reservoir 170 when the piston oil pump 140 pumps oil into the main oil reservoir 170 and draws air into the main oil reservoir 170 through the air pipe 172 when the piston head 148 of the piston oil pump 140 is pulled upward by the uncoiling of the helical compression spring 130. Specifically, during the compression phase of operation, when the piston oil pump 140 forces hydraulic fluid into the main oil reservoir 170, the increasing fluid volume creates positive pressure within the main oil reservoir 170. The air pipe 172 responds to this pressure increase by ejecting displaced air through the air vent 174, maintaining atmospheric pressure conditions within the main oil reservoir 170. The air vent 174 needs to release air displaced by the hydraulic fluid when the piston oil pump 140 pumps oil into the main oil reservoir 170. This process generates positive pressure within the reservoir, requiring an efficient venting mechanism to maintain atmospheric pressure.

In FIG. 1, the air vent 174 is illustrated as extending through the road surface 10, however the air vent 174 is more preferably located through the side wall 102*b* in the upper section 104 of the housing to a location off the roadway, such as a median strip or a shoulder of the roadway as shown in FIG. 2. By locating the air vent off the roadway (e.g., on the side wall and possibly extending into a median strip or shoulder), the vent is shielded from road debris, moisture, and extreme road temperatures, contributing to its longevity and reliability. The off-road venting prevents obstructions that may interfere with the venting process while ensuring proper air flow as the system operates.

The ejection phase occurs synchronously with the downward motion of the piston head 148 within the cylinder 142, ensuring pressure equilibrium throughout the fluid transfer process. Further, when the helical compression spring 130 uncoils and initiates upward motion of the piston head 148, the air pipe 172 reverses its flow direction. As the piston head 148 withdraws hydraulic fluid from the main oil reservoir 170, the air pipe 172 draws atmospheric air through the air vent 174 to replace the volume of extracted fluid. This bidirectional air flow capability of the air pipe 172 maintains consistent atmospheric pressure within the main oil reservoir 170 throughout all operational phases, preventing vacuum formation during fluid withdrawal and ensuring reliable hydraulic system performance.

The energy generating speed bump assembly 100 further includes a compressed oil tank 180 connected to the main oil reservoir 170 and to the piston oil pump 140. The compressed oil tank 180 is placed adjacent to the main oil reservoir 170, within the same middle section 106 of the housing 102. The compressed oil tank 180 is installed at a similar depth as the main oil reservoir 170, with its upper surface approximately 0.1-0.2 meters below the surface of the roadway 10. The compressed oil tank 180 may be fabricated from carbon steel with a specialized epoxy coating resistant to hydraulic fluid exposure. The compressed oil tank 180 is configured to receive oil from the main oil reservoir 170 when the piston head 148 is depressed within the piston oil pump 140. That is, the compressed oil tank 180 receives hydraulic fluid from the main oil reservoir 170 during the compression phase of the speed bump 110, when the piston head 148 undergoes downward displacement within the cylinder 142. When the piston head 148 of the piston oil pump 140 compresses the oil 146 within the cylinder 142, the resulting pressure increase drives fluid through the connecting hydraulic lines into the compressed oil tank 180. The positioning of the compressed oil tank 180 within the middle section 106 and extending into the upper section 104 of the housing 102 enables efficient fluid transfer while maintaining the complete hydraulic system within the subterranean installation.

The energy generating speed bump assembly 100 further includes an oil turbine 182 connected to the compressed oil tank 180. The oil turbine 182 is connected to the compressed oil tank 180 through hydraulic connections, as shown. The oil turbine 182 is positioned within the lower section 108 of the housing 102, located immediately downstream of the compressed oil tank 180. The oil turbine 182 is fully enclosed within the housing 102 with its bottom surface located on the bottom of the lower section at about 0.95 m and its top surface at a depth of 0.3 meters below the surface of the roadway 10, ensuring protection from environmental factors while maintaining accessibility for maintenance operations. The oil turbine 182 is configured to receive a stream of compressed oil when the piston head 148 is depressed within the piston oil pump 140. During operation, pressurized hydraulic fluid from the compressed oil tank 180 flows into the oil turbine 182. Herein, the stream of compressed oil is configured to rotate a turbine shaft 184 of the oil turbine 182. Particularly, in the present configuration, the stream of compressed oil engages a turbine rotor (not shown) of the oil turbine 182, configured to rotate the turbine shaft 184. The oil turbine 182 functions as an energy conversion device, transforming the hydraulic energy from the pressurized oil stream into mechanical rotational energy through the turbine shaft 184. The oil turbine 182 employs a radial flow impulse design optimized for the operating pressure and flow characteristics of the hydraulic system.

The hydraulic circuit of the energy generating speed bump assembly 100 implements a closed-loop configuration. Herein, the compressed oil returns to the main oil reservoir 170 after passing through the oil turbine 182. That is, following energy transfer to the turbine shaft 184, the hydraulic fluid exits the oil turbine 182 at reduced pressure and flows through return piping. In some examples, the return flow path incorporates passages that minimize turbulence and cavitation while maintaining consistent flow characteristics. The main oil reservoir 170, with integrated internal baffles, receives the returned fluid while maintaining atmospheric pressure through the air vent 174.

The energy generating speed bump assembly 100 further includes an electrical generator 186 connected to the turbine shaft 184. In the present configuration, the electrical generator 186 may be connected to the turbine shaft 184 through a direct coupling mechanism. The electrical generator 186 is positioned within the lower section 108 of the housing 102, installed beneath the oil turbine 182 at a depth of 0.35 meters below the surface of the roadway 10. The electrical generator 186 maintains vertical alignment with the oil turbine 182 to optimize space utilization and mechanical energy transfer efficiency within the housing 102. The electrical generator 186 is configured to generate electricity when the turbine shaft 184 is rotated by the stream of compressed oil, flowing through the oil turbine 182. In an example, the electrical generator 186 employs a permanent magnet synchronous design to produce electricity. The electrical generator 186 may be protected from external environmental factors through installation within a sealed compartment in the lower section 108 of the housing 102.

The energy generating speed bump assembly 100 further includes a wiring harness 188 connected to an electronics outlet of the electrical generator 186. The electronics outlet is located on a wall of the lower section of the housing in a waterproof compartment. As shown in FIG. 2, the wiring harness 188 is connected to an outlet terminal 190 positioned on one of the first wall **102*a* and the second wall 102*b* of the housing 102 near the top surface 102*e*. The outlet terminal 190** maintains an environmental protection rating and incorporates surge protection, for safe connection to external electrical loads while maintaining system integrity.

Both the air vent and electronics outlet must be positioned outside of high-impact zones (such as areas directly under vehicle tires or in the center of the speed bump) to minimize risk of damage from vehicle passage or accidental impact and are preferably located on a median strip or shoulder of the roadway.

Further, adequate drainage features around the locations of the air vent and the electronics outlet should be considered to ensure that neither the vent nor the electronics outlet becomes blocked or flooded under adverse weather conditions.

In an aspect of the present disclosure, the energy generating speed bump assembly 100 includes a first access plate 192 located on the top surface **102*e* of the housing 102. The first access plate 192 is configured to provide maintenance access to the middle section 106 containing the hydraulic fluid management components. In an example, the first access plate 192 measures about 0.6 meters by about 0.4 meters. The first access plate 192 maintains a load rating in accordance with highway standards to ensure structural integrity under vehicle loading conditions. The energy generating speed bump assembly 100 also includes a second access plate 194 located on the bottom surface 106*b* of the middle section 106. The second access plate 194 is configured to provide access to the oil turbine 182 and electrical generator 186, installed within the lower section 108. In an example, the second access plate 194 also measures about 0.6 meters by about 0.4 meters. Such access plate configuration enables routine inspection and maintenance of system components while preserving the structural and environmental integrity of the housing 102**.

The energy generating speed bump assembly 100 integrates with roadside electrical infrastructure through a power distribution system. In aspects of the present disclosure, the energy generating speed bump assembly 100 may include an electrical box 196 which connects to the outlet terminal 190, and which may include at least an inverter **198*a* and a battery 198*b* to store the current, and a controller (not shown in FIG. 1, but illustrated in detail in FIGS. 5-8) which manages the charging and discharging of the battery 198*b***. The controller manages the operation of the electrical system, implementing adaptive charging algorithms and load management strategies. The controller monitors key parameters including battery state of charge, instantaneous power generation, and load demands, optimizing system performance through real-time adjustment of operating parameters. The power distribution system connects to standard roadway infrastructure including LED street lighting systems, traffic signals, and auxiliary power outlets.

The operational sequence of the energy generating speed bump assembly 100 includes multiple phases, each characterized by specific mechanical and hydraulic parameters. The first phase initiates when a vehicle engages the speed bump 110 (as shown in FIG. 1), inducing vertical displacement. This displacement drives the piston rod 144 through its stroke, generating hydraulic pressure within the cylinder 142. The entire compression event occurs within a short interval, determined by vehicle mass and velocity characteristics. During a second phase, oil 146 transfers from the cylinder 142 to the compressed oil tank 180, enabling energy storage durations. This stored energy subsequently drives a third phase, during which the oil turbine 182 operates, enabling the electrical generator 186 to produce AC output. Further, during a fourth phase, the helical compression spring 130 exerts return force, which returns the speed bump 110 to its initial position, simultaneously drawing oil from the main oil reservoir 170 into the cylinder 142 through gravity-assisted flow. The complete system reset occurs within few seconds, preparing the energy generating speed bump assembly 100 for subsequent activation cycles.

FIG. 2 illustrates a diagrammatic top view of the energy generating speed bump assembly 100 showing its installation configuration with respect to a roadway 10. The energy generating speed bump assembly 100 is shown installed perpendicular to the direction of vehicular traffic, with the length of the speed bump 110 extending at least partially across the width of a single traffic lane. The width of the speed bump 110 facilitates engagement with a single vehicle tire at a time, providing energy transfer efficiency while maintaining controlled vehicle deceleration. The illustration also provides a schematic representation of the internal component layout within the housing 102, illustrating the spatial relationship between the mechanical, hydraulic, and electrical subsystems. As shown, the energy generating speed bump assembly 100 includes the main oil reservoir 170 and the compressed oil tank 180, followed by the oil turbine 182 and the electrical generator 186. This arrangement provide efficient space utilization within the housing 102, with all components arranged in a logical sequence following the energy conversion flow path from mechanical input to electrical output. The illustration also shows that the housing 102 is integrated within the roadway 10, flush with the surface of the roadway 10.

Figure 3:
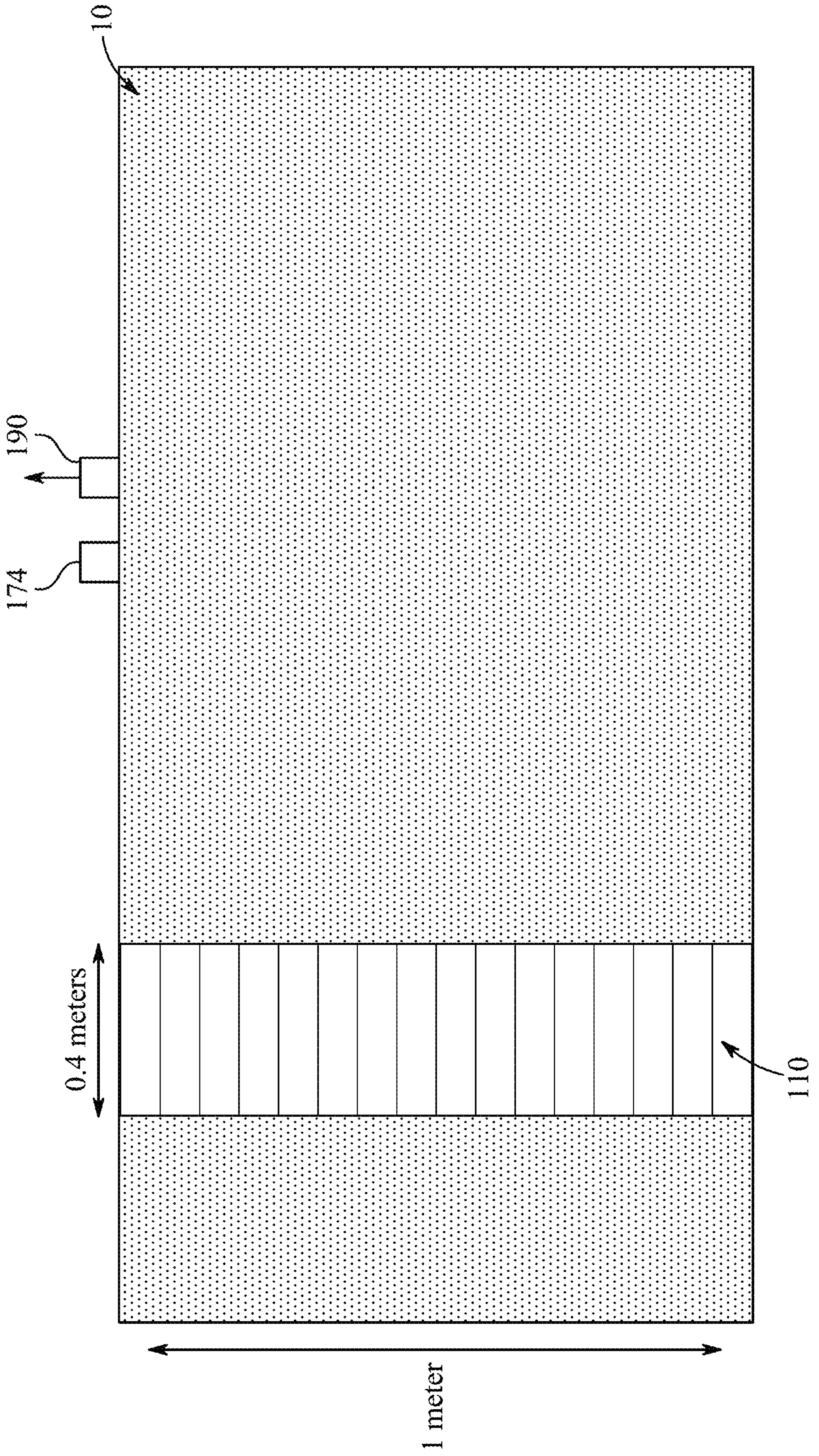
FIG. 3 is an exemplary diagrammatic top illustration of the energy generating speed bump assembly showing its layout with respect to a roadway, according to certain embodiments.

Referring now to FIG. 3, a top perspective view of the roadway 10 incorporating the speed bump 110 is shown. The top of the housing 102*e* is covered by the surface of the roadway 10 after installation of the assembly. as illustrated, the speed bump extends only 0.4 meters in the travel lane and extends across the travel lane for 2.5 meters. The air vent 174 and electronics outlet terminal 190 are shown at the side of the roadway 10.

Figure 4:
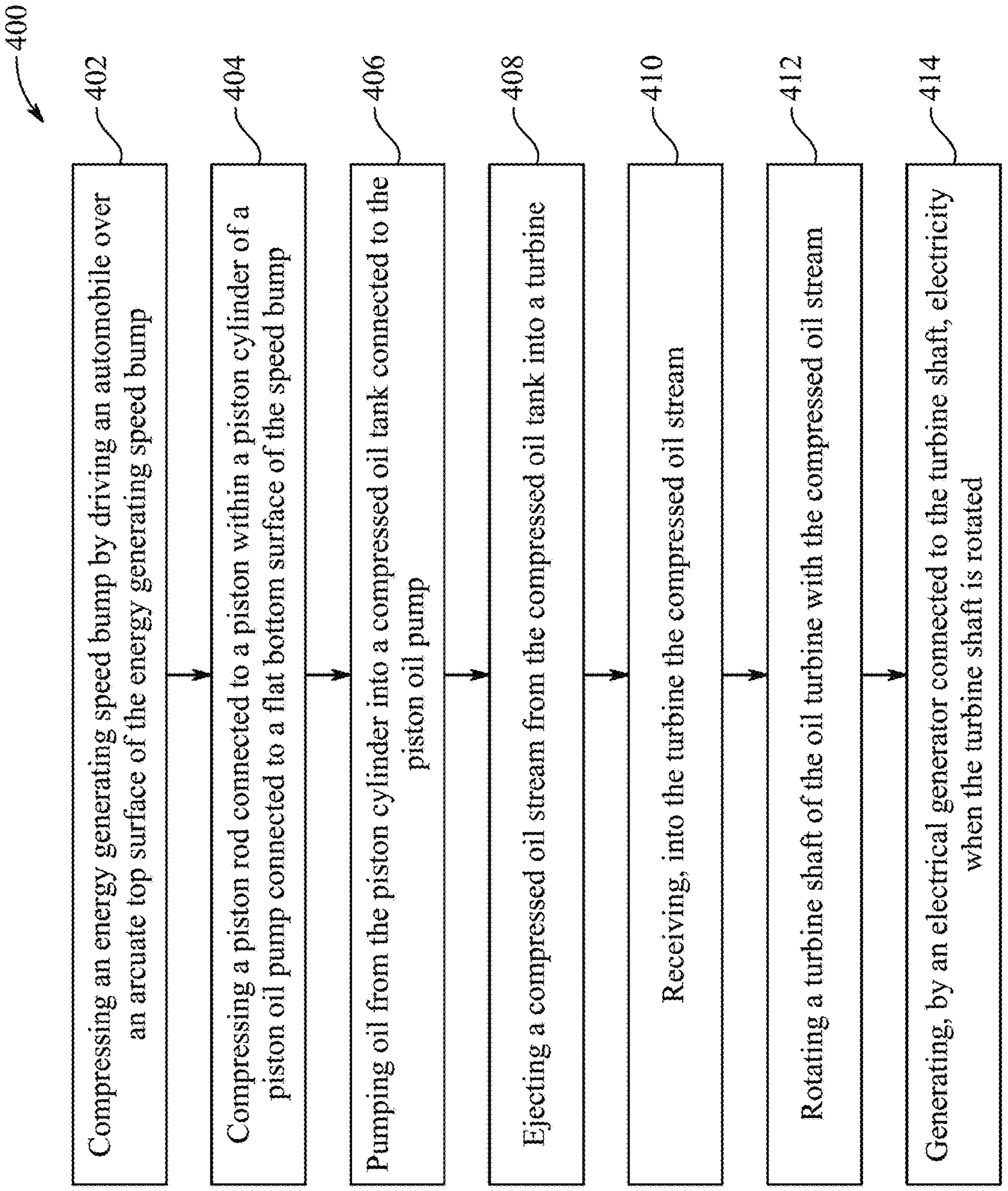
FIG. 4 is an exemplary flowchart listing steps involved in a method for generating electrical energy with the energy generating speed bump assembly, according to certain embodiments.

Referring now to FIG. 4, the present disclosure further provides a method (as represented by a flowchart, referred by reference numeral 400) for operating the speed bump to generate electricity. The method 400 includes a series of steps. These steps are only illustrative, and other alternatives may be considered where one or more steps are added, one or more steps are removed, or one or more steps are provided in a different sequence without departing from the scope of the present disclosure. Various variants disclosed above, with respect to the aforementioned circular waste bin cover 100 apply mutatis mutandis to the present method 400 for assembly thereof.

At step 402, the method 400 includes compressing an energy generating speed bump (i.e., the speed bump 110 as discussed above) by driving an automobile over an arcuate top surface of the energy generating speed bump 110. This process initiates when the automobile (vehicle) engages the arcuate top surface 110*c* of the speed bump 110, applying a downward force that causes vertical displacement of the speed bump 110 within the channel 120. The arcuate top surface 110*c* enables controlled deceleration of the vehicle while converting kinetic energy of the vehicle into potential energy stored in the helical compression spring 130 and pressure energy in the hydraulic system. The compression phase occurs over an interval of 0.2 to 0.5 seconds, depending on vehicle mass and velocity characteristics.

At step 404, the method 400 includes compressing the piston rod 144 connected to the piston head 148 within a piston cylinder (i.e., the cylinder 142, as discussed above) of the piston oil pump 140 connected to the flat bottom surface 110*d* of the speed bump 110. During this process, the vertical displacement of the speed bump 110 transfers force through the cylinder mounting bracket 158 to the piston rod 144, which drives the piston head 148 downward within the cylinder 142. The piston rod 144 travels through its stroke length and this motion generates hydraulic pressure within the cylinder 142, with the pressure increase rate controlled by the flow resistance of the hydraulic circuit.

At step 406, the method 400 includes pumping oil from the piston cylinder 142 into the compressed oil tank 180 (via the main oil reservoir 170) connected to the piston oil pump 140. The downward motion of the piston head 148 forces hydraulic fluid from the cylinder 142 through the piping into the compressed oil tank 180. The fluid transfer occurs at flow rates between 20 and 40 liters per minute, regulated by hydraulic resistance characteristics of the hydraulic circuit. The compressed oil tank 180, maintaining an air-to-oil ratio of 40:60, receives this pressurized fluid while increasing its internal pressure up to the operating threshold, with excess pressure prevented, for instance, by a relief valve.

At step 408, the method 400 includes ejecting a compressed oil stream from the compressed oil tank 180 into a turbine (i.e., the oil turbine 182, as discussed above). Herein, upon reaching operational pressure within the compressed oil tank 180, the pressurized hydraulic fluid is released through ports into the oil turbine 182. The fluid stream maintains consistent flow characteristics through flow passages, with flow rates optimized to drive the turbine rotor at its optimal speed. The compressed oil stream velocity and direction are controlled to maximize energy transfer efficiency to the oil turbine 182.

At step 410, the method 400 includes receiving, into the turbine 182, the compressed oil stream. The oil turbine 182 receives the pressurized fluid stream through inlet ports designed to optimize flow characteristics. The radial flow impulse turbine design converts pressure and kinetic energy from the fluid into rotational motion of the turbine rotor, which in turn is transferred to the turbine shaft 184. Herein, the bearings support the turbine shaft 184 while minimizing friction losses, enabling sustained operation at the design speed of the oil turbine 182 with minimal wear.

At step 412, the method 400 includes rotating the turbine shaft 184 of the oil turbine 182 the compressed oil stream. During this process, the pressurized fluid stream impinges on blades of the turbine rotor, causing rotation of the turbine shaft 184. The turbine shaft 184 maintains constant rotational velocity through flow regulation and load matching. The bearings support rotation of the turbine shaft 184 while minimizing mechanical losses, achieving high operational efficiency under normal conditions.

At step 414, the method 400 includes generating, by the electrical generator 186 connected to the turbine shaft 184, electricity when the turbine shaft 184 is rotated. Herein, the electrical generator 186, directly coupled to the turbine shaft 184, converts the mechanical rotation into electrical power. The permanent magnet synchronous generator design produces three-phase AC power.

In aspects of the present disclosure, the method 400 further includes raising, by the helical compression spring 130 connected to the flat bottom surface 110*d* of the speed bump 110 and the cylinder 142, the speed bump 110 to an undepressed configuration in which the arcuate top surface 110*c* of the speed bump 110 extends above a surface of the roadway 10. That is, following the compression phase, the helical compression spring 130 expands from its compressed state. This expansion generates a return force of 20 kN, lifting the speed bump 110 back to its original position over a 0.5 to 1.0-second interval. The helical compression spring 130 facilitates complete return of the speed bump 110 to the position where the arcuate top surface 110*c* extends above the roadway surface 10.

The method 400 further includes drawing oil into the cylinder 142 from the main oil reservoir 170 when the helical compression spring 130 raises the speed bump 110 to an undepressed configuration. Herein, raising the speed bump 110 to the undepressed configuration causes the piston head 148 to rise within the cylinder 142 and create a vacuum in a lower part of the cylinder 142. That is, during the return stroke, as the helical compression spring 130 raises the speed bump 110, the piston head 148 moves upward within the cylinder 142. This upward motion creates a pressure differential between the cylinder 142 and the main oil reservoir 170. The resulting vacuum effect in the lower portion of the cylinder 142 draws hydraulic fluid from the main oil reservoir 170 through the hydraulic circuit. The fluid transfer occurs through the piping, replenishing the cylinder 142 for the next compression cycle.

The method 400 further includes pumping, by the turbine 182, the compressed oil to the main oil reservoir 170 after the oil stream passes through the oil turbine 182. That is, after transferring energy to the turbine rotor, the hydraulic fluid exits the oil turbine 182 at reduced pressure and returns to the main oil reservoir 170. The fluid return path incorporates flow passages that minimize turbulence and cavitation while maintaining consistent flow characteristics. The main oil reservoir 170 receives the returned fluid while maintaining atmospheric pressure through the air vent 174.

The method 400 further includes connecting the wiring harness 188 to the generator 186. Herein, the electrical output from the electrical generator 186 is conducted through the wiring harness 188 with insulation. The method 400 also includes routing the wiring harness 188 to the outlet terminal 190 located near the top surface 102*e* of the housing 102. The wiring harness 188 routes through dedicated conduit to the outlet terminal 190 positioned near the top surface 102*e* of the housing 102. In present configuration, the outlet terminal 190 maintains environmental protection and incorporates surge protection. The method 400 also includes connecting the wiring harness 188 to an electrical load. Herein, the outlet terminal 190 facilitates connection to external electrical loads while maintaining system safety and reliability standards.

The energy generating speed bump assembly 100 and the method 400 of the present disclosure provide technical advancement in traffic control infrastructure through integration of mechanical shock absorption and hydraulic power generation in a unified, self-contained system. The housing 102 facilitates complete subsurface installation of all components, eliminating requirements for external power management infrastructure. The speed bump 110 with arcuate top surface 110*c* and the tapered side surface 110*a*, combined with the spring-loaded channel 120, creates controlled vehicle deceleration while maximizing energy capture through the piston oil pump 140.

The energy generating speed bump assembly 100 can incorporate data collection and monitoring capabilities using the controller through integration with municipal infrastructure management systems. The controller can implement real-time monitoring of traffic patterns, vehicle speed characteristics, and power generation parameters. These monitoring capabilities enable optimization of traffic flow patterns while maintaining precise records of energy generation efficiency. The energy generating speed bump assembly 100 further maintains compatibility with standard urban monitoring systems including speed measurement devices, vehicle counting mechanisms, and traffic flow analysis equipment.

The energy generating speed bump assembly 100 has applicability across urban infrastructure implementations. The energy generating speed bump assembly 100 enables installation within municipal street networks, traffic intersections, and educational facility zones, providing dual functionality of traffic speed regulation and electrical power generation. The electrical output from the generator 186 supplies power to adjacent infrastructure components including street illumination systems, traffic control signals, and supplementary municipal electrical requirements through integration with local power distribution networks.

The energy generating speed bump assembly 100 further provides quantifiable environmental and economic benefits through implementation of renewable energy generation principles. The conversion of vehicular kinetic energy into electrical power reduces municipal dependence on conventional power generation systems, contributing to reduced carbon emissions within urban environments. The shock absorption characteristics of the speed bump 110 and the helical compression spring 130 reduce mechanical stress on vehicle suspension components, providing measurable reductions in vehicle maintenance requirements. Installation of the energy generating speed bump assembly 100 enables municipalities to achieve measurable reductions in electrical power procurement costs through sustained on-site power generation capabilities.

Performance analysis of the energy generating speed bump assembly 100 through computational modeling and simulation protocols indicated significant energy generation capacity. Theoretical calculations demonstrated potential electrical generation of 110 kilowatt-hours per 24-hour period under high traffic volume conditions. This energy output capacity enables sustained operation of multiple street illumination units and traffic control signals within the installation zone. The mechanical response characteristics of the assembly of the speed bump 110 and the helical compression spring 130 can be optimized through finite element analysis to achieve maximum energy capture efficiency while maintaining controlled vehicle deceleration parameters.

The design parameters of the energy generating speed bump assembly 100 have undergone comprehensive validation through computational modeling methodologies. The dimensional specifications of the speed bump 110, the channel 120, and associated mechanical components have been optimized through iterative simulation processes to achieve maximum energy conversion efficiency. The spring rate of 20 kN/m for the helical compression spring 130 has been determined through detailed analysis of vehicle mass distributions and typical traffic speed characteristics. The piston oil pump 140 demonstrated theoretical compression ratios compatible with sustained operation of the oil turbine 182 and the electrical generator 186. Computational fluid dynamics analysis validated the hydraulic circuit design, confirming stable flow characteristics between the main oil reservoir 170 and the compressed oil tank 180.

Energy generation calculations for the assembly 100 incorporated variables including traffic volume, vehicle mass distribution, and temporal usage patterns. Simulation results indicated sustained power generation capacity sufficient for operation of multiple street illumination units and traffic control signals. The mechanical response characteristics of the assembly 100 maintained compatibility with standard vehicle suspension systems while achieving optimal energy capture efficiency. The integrated design of the housing 102 enables standardized installation procedures within existing roadway infrastructure while maintaining complete environmental isolation of internal components.

A first embodiment describes an energy generating speed bump assembly 100, comprising: a housing 102 including a top surface 102*e*, a bottom surface 102*f*, a first wall 102*a*, a second wall 102*b* opposite the first wall 102*a*, a third wall 102*c* connected to the first wall 102*a* and the second wall 102*b*, wherein the third wall 102*c* is perpendicular to the first wall, and a fourth wall 102*d* connected to the first wall 102*a* and the second wall 102*b* and opposite to the third wall 102*c*, wherein the housing 102 includes three sections configured as an upper section 104 adjoining the top surface 102*e*, a middle section 106 below the upper section 104 and a lower section 108 below the middle section 106, wherein the housing 102 is mounted within a trench 12 in a roadway 10; a speed bump 110 having a tapered side surface 110*a*, a flat bottom surface 110*d*, an arcuate top surface 110*c* and an arcuate side surface 110*b*, wherein the arcuate top surface 110*c* is configured to extend from an upper end of the tapered side surface 110*a* to the arcuate side surface 110*b*, and the arcuate side surface 110*b* is configured to extend from the arcuate top surface 110*c* to the flat bottom surface 110*d*; a channel 120 located within the housing 102, the channel 120 having an opening configured to receive the flat bottom surface 110*d*, the tapered side surface 110*a* and the arcuate side surface 110*b* of the speed bump 110, wherein the channel 120 has a lower surface 120*a* and tapered sides, including a first tapered side 120*b* and a second tapered side 120*c*, wherein an angle of a first tapered side 120*b* of the channel 120 is configured to match an angle of the tapered side surface 110*a* of the speed bump 110; a helical compression spring 130 having a top end 130*a* mounted to the flat bottom surface 110*d* of the speed bump 110, wherein the helical compression spring 130 is configured to coil in response to a depression of the speed bump 110 into the channel 120 and to uncoil and return the speed bump 110 to an undepressed configuration in which the arcuate top surface 110*c* of the speed bump 110 extends above a surface of the roadway 10; a piston oil pump 140 including a cylinder 142, a piston rod 144 and a piston head 148 configured to move within the cylinder 142, wherein a first end 144*a* of the piston rod 144 is mounted to the flat bottom surface 110*d* of the speed bump 110 and a second end 144*b* of the piston rod 144 is connected to the piston head 148, wherein a bottom end 130*b* of the helical compression spring 130 is mounted to an indented ring on an outside surface of the piston head 148; a main oil reservoir 170 connected to the piston oil pump 140, wherein oil in the main oil reservoir 170 is at atmospheric pressure, wherein the piston oil pump 140 is configured to pump oil from the cylinder 142 into the main oil reservoir 170 when the piston head 148 is depressed by the speed bump 110 and withdraw oil from the main oil reservoir 170 when the helical compression spring 130 uncoils and returns the speed bump 110 to the undepressed configuration; a compressed oil tank 180 connected to the main oil reservoir 170 and to the piston oil pump 140, wherein the compressed oil tank 180 is configured to receive oil from the main oil reservoir 170 when the piston head 148 is depressed within the piston oil pump 140; an oil turbine 182 connected to the compressed oil tank 180, wherein the oil turbine 182 is configured receive a stream of compressed oil when the piston head 148 is depressed within the piston oil pump 140, wherein the stream of compressed oil is configured to rotate a turbine shaft 184 of the oil turbine 182; and an electrical generator 186 connected to the turbine shaft 184, wherein the electrical generator 186 is configured to generate electricity when the turbine shaft 184 is rotated by the stream of compressed oil.

In an aspect, the energy generating speed bump assembly 100, further comprises vertical guide rails 150*a*, 150*b* configured to surround the piston oil pump 140 and prevent lateral displacement of the piston head 148.

In an aspect, the helical compression spring 130 is a helical compression spring configured to encircle the piston rod 144, wherein the helical compression spring 130 is seated between the top of the piston head 148 and the flat bottom surface 110*d* of the speed bump 110.

In an aspect, the helical compression spring 130 is about 0.2 m in height.

In an aspect, the energy generating speed bump assembly 100, further comprises: a steel mounting plate 154 located on the flat bottom surface 110*d* of the speed bump 110 and a U-shaped bracket 156 connected to the steel mounting plate 154, wherein the first end 144*a* of the piston rod 144 is connected to the U-shaped bracket 156.

In an aspect, the energy generating speed bump assembly 100, further comprises: a cylinder mounting bracket 158 attached by bolts to a bottom surface 104*b* of the upper section 104, wherein the cylinder mounting bracket 158 is configured to hold a base 143 of the cylinder 142 to the bottom surface 104*b* of the upper section 104; and a plurality of rubber damping pads 160 placed between the base 143 of the cylinder 142 and the cylinder mounting bracket 158, wherein the plurality of rubber damping pads 160 are configured to absorb vibrations and prevent mechanical wear of the cylinder 142.

In an aspect, a top of the channel 120 is configured to align with a top edge of the trench 12 in the roadway 10.

In an aspect, the trench 12 in the roadway 10 is lined with reinforced concrete 14 configured to support the channel 120 and prevent deformation of the trench 12 under heavy loads.

In an aspect, the housing 102 is mounted within the trench 12 by anchors 16 bolted to the reinforced concrete 14.

In an aspect, trench 12 has a length (across the roadway) in a range of about 2.5 m to about 3.7 m, a width (along the roadway) in a range of about 1.65 m to 2.0 m and a depth (into the roadway) in a range of about 0.95 m to about 1 m.

In an aspect, the energy generating speed bump assembly 100, further comprises a wiring harness 188 connected to the generator 186, wherein the wiring harness 188 is connected to an outlet terminal 190 located on one of the first wall 102*a* and the second wall 102*b* of the housing 102 near the top surface 102*e* of the housing 102.

In an aspect, the top surface 102*e* of the housing 102 includes a lip 109 around an outer edge of the top surface 102*e*, wherein the lip 109 includes bolt holes configured to receive anchor bolts 18 which secure the housing 102 to a surface of the roadway 10.

In an aspect, the housing 102 includes a first access plate 192 located on the top surface of the middle section 106, wherein the first access plate 192 is configured to provide access to the middle section 106, and a second access plate 194 located on a bottom surface 106*b* of the middle section 106, wherein the second access plate 194 is configured to provide access to the turbine 182 and the generator 186.

In an aspect, the energy generating speed bump assembly 100, further comprises an air pipe 172 connected to an air vent 174 located at a top surface of the main oil reservoir 170, wherein the air pipe 172 is configured to eject air from the main oil reservoir 170 when the piston oil pump 140 pumps oil into the main oil reservoir 170 and draw air into the main oil reservoir 170 through the air pipe 172 when the piston head 148 of the piston oil pump 140 is pulled upward by the uncoiling of the helical compression spring 130.

In an aspect, the compressed oil is returned to the main oil reservoir 170 after passing through the oil turbine 182.

A second embodiment describes a method 400 for generating electrical energy with an energy generating speed bump assembly 100, comprising: compressing an energy generating speed bump 110 by driving an automobile over an arcuate top surface 110*c* of the energy generating speed bump 110; compressing a piston rod 144 connected to a piston head 148 within a piston cylinder 142 of a piston oil pump 140 connected to a flat bottom surface 110*d* of the speed bump 110; pumping oil from the piston cylinder 142 into a compressed oil tank 180 connected to the piston oil pump 140; ejecting a compressed oil stream from the compressed oil tank 180 into a turbine 182; receiving, into the turbine 182 the compressed oil stream; rotating a turbine shaft 184 of the oil turbine 182 with the compressed oil stream; and generating, by an electrical generator 186 connected to the turbine shaft 184, electricity when the turbine shaft 184 is rotated.

In an aspect, the method 400, further comprises: raising, by a helical compression spring 130 connected to the flat bottom surface 110*d* of the speed bump 110 and the cylinder 142, the speed bump 110 to an undepressed configuration in which the arcuate top surface 110*c* of the speed bump 110 extends above a surface of the roadway 10.

In an aspect, the method 400, further comprises: drawing oil into the cylinder 142 from a main oil reservoir 170 when the helical compression spring 130 raises the speed bump 110 to an undepressed configuration, wherein raising the speed bump 110 to the undepressed configuration causes the piston head 148 to rise within the cylinder 142 and create a vacuum in a lower part of the cylinder 142.

In an aspect, the method 400, further comprises: pumping, by the turbine 182, the compressed oil to the main oil reservoir 170 after the oil stream passes through the oil turbine 182.

In an aspect, the method 400, further comprises: connecting a wiring harness 188 to the generator 186; routing the wiring harness 188 to an outlet terminal 190 located near the top surface 102*e* of the housing 102; and connecting the wiring harness 188 to an electrical load.

Figure 5:
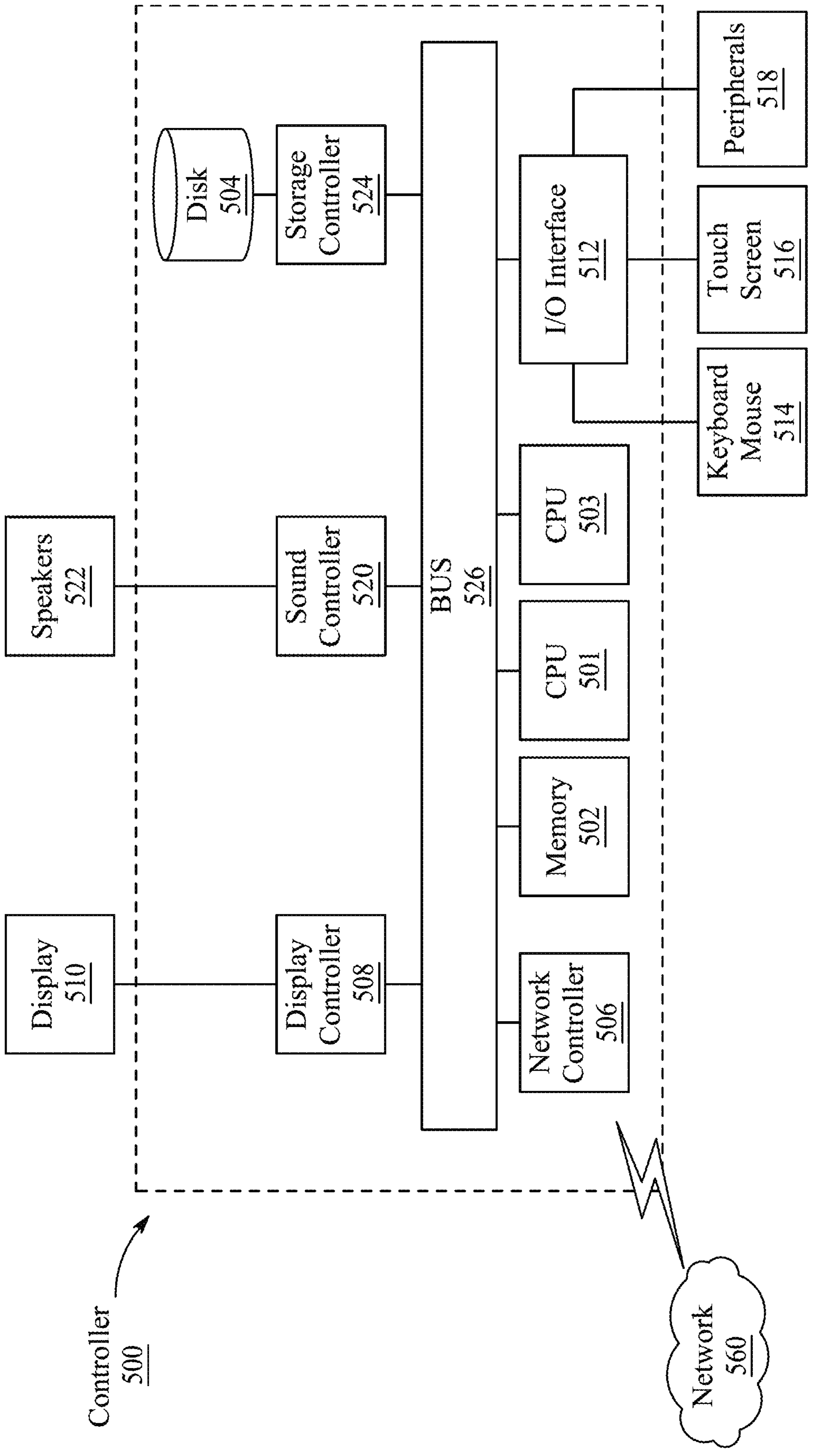
FIG. 5 is an illustration of a non-limiting example of details of computing hardware used in the computing system, according to certain embodiments.

Next, further details of the hardware description of the computing environment is described with reference to FIG. 5. In FIG. 5, a controller 500 is described is representative of the controller in the electrical box 196 of the energy generating speed bump assembly 100, in which the controller 500 is a computing device which includes a CPU 501 which performs the processes described above/below. The process data and instructions may be stored in memory 502. These processes and instructions may also be stored on a storage medium disk 504 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 501, 503 and an operating system such as Microsoft Windows 7, Microsoft Windows 8, Microsoft Windows 10, UNIX, Solaris, LINUX, Apple MAC-OS and other systems known to those skilled in the art.

The hardware elements in order to achieve the computing device may be realized by various circuitry elements, known to those skilled in the art. For example, CPU 501 or CPU 503 may be a Xenon or Core processor from Intel of America or an Opteron processor from AMD of America, or may be other processor types that would be recognized by one of ordinary skill in the art. Alternatively, the CPU 501, 503 may be implemented on an FPGA, ASIC, PLD or using discrete logic circuits, as one of ordinary skill in the art would recognize. Further, CPU 501, 503 may be implemented as multiple processors cooperatively working in parallel to perform the instructions of the inventive processes described above.

The computing device in FIG. 5 also includes a network controller 506, such as an Intel Ethernet PRO network interface card from Intel Corporation of America, for interfacing with network 560. As can be appreciated, the network 560 can be a public network, such as the Internet, or a private network such as an LAN or WAN network, or any combination thereof and can also include PSTN or ISDN subnetworks. The network 560 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 508, such as a NVIDIA GeForce GTX or Quadro graphics adaptor from NVIDIA Corporation of America for interfacing with display 510, such as a Hewlett Packard HPL2445w LCD monitor. A general purpose I/O interface 512 interfaces with a keyboard and/or mouse 514 as well as a touch screen panel 516 on or separate from display 510. General purpose I/O interface also connects to a variety of peripherals 518 including printers and scanners, such as an OfficeJet or DeskJet from Hewlett Packard.

A sound controller 520 is also provided in the computing device such as Sound Blaster X-Fi Titanium from Creative, to interface with speakers/microphone 522 thereby providing sounds and/or music.

The general purpose storage controller 524 connects the storage medium disk 504 with communication bus 526, which may be an ISA, EISA, VESA, PCI, or similar, for interconnecting all of the components of the computing device. A description of the general features and functionality of the display 510, keyboard and/or mouse 514, as well as the display controller 508, storage controller 524, network controller 506, sound controller 520, and general purpose I/O interface 512 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 6.

Figure 6:
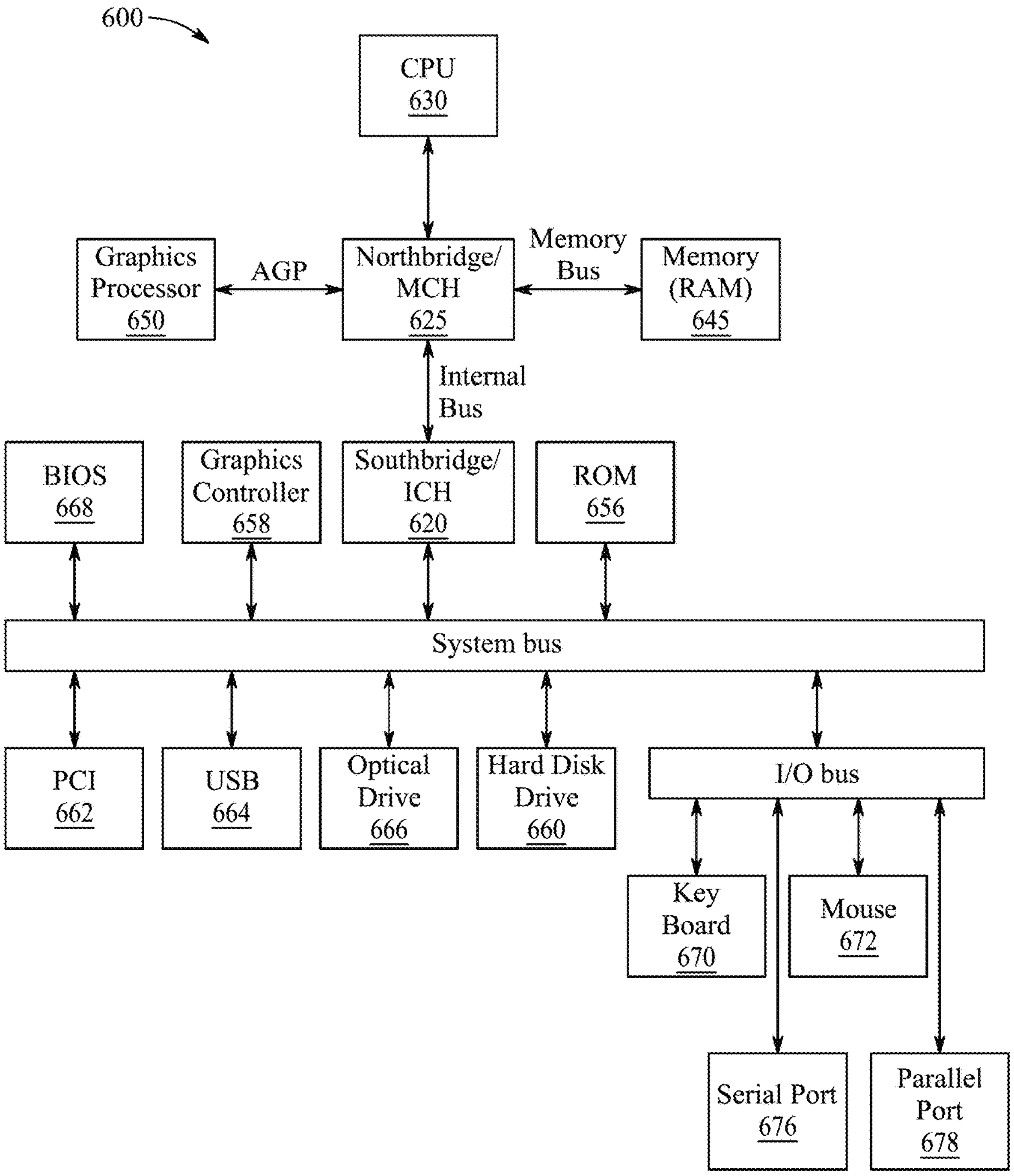
FIG. 6 is an exemplary schematic diagram of a data processing system used within the computing system, according to certain embodiments.

FIG. 6 shows a schematic diagram of a data processing system, according to certain embodiments, for performing the functions of the exemplary embodiments. The data processing system is an example of a computer in which code or instructions implementing the processes of the illustrative embodiments may be located.

In FIG. 6, data processing system 600 employs a hub architecture including a north bridge and memory controller hub (NB/MCH) 625 and a south bridge and input/output (I/O) controller hub (SB/ICH) 620. The central processing unit (CPU) 630 is connected to NB/MCH 625. The NB/MCH 625 also connects to the memory 645 via a memory bus, and connects to the graphics processor 650 via an accelerated graphics port (AGP). The NB/MCH 625 also connects to the SB/ICH 620 via an internal bus (e.g., a unified media interface or a direct media interface). The CPU Processing unit 630 may contain one or more processors and even may be implemented using one or more heterogeneous processor systems.

Figure 7:
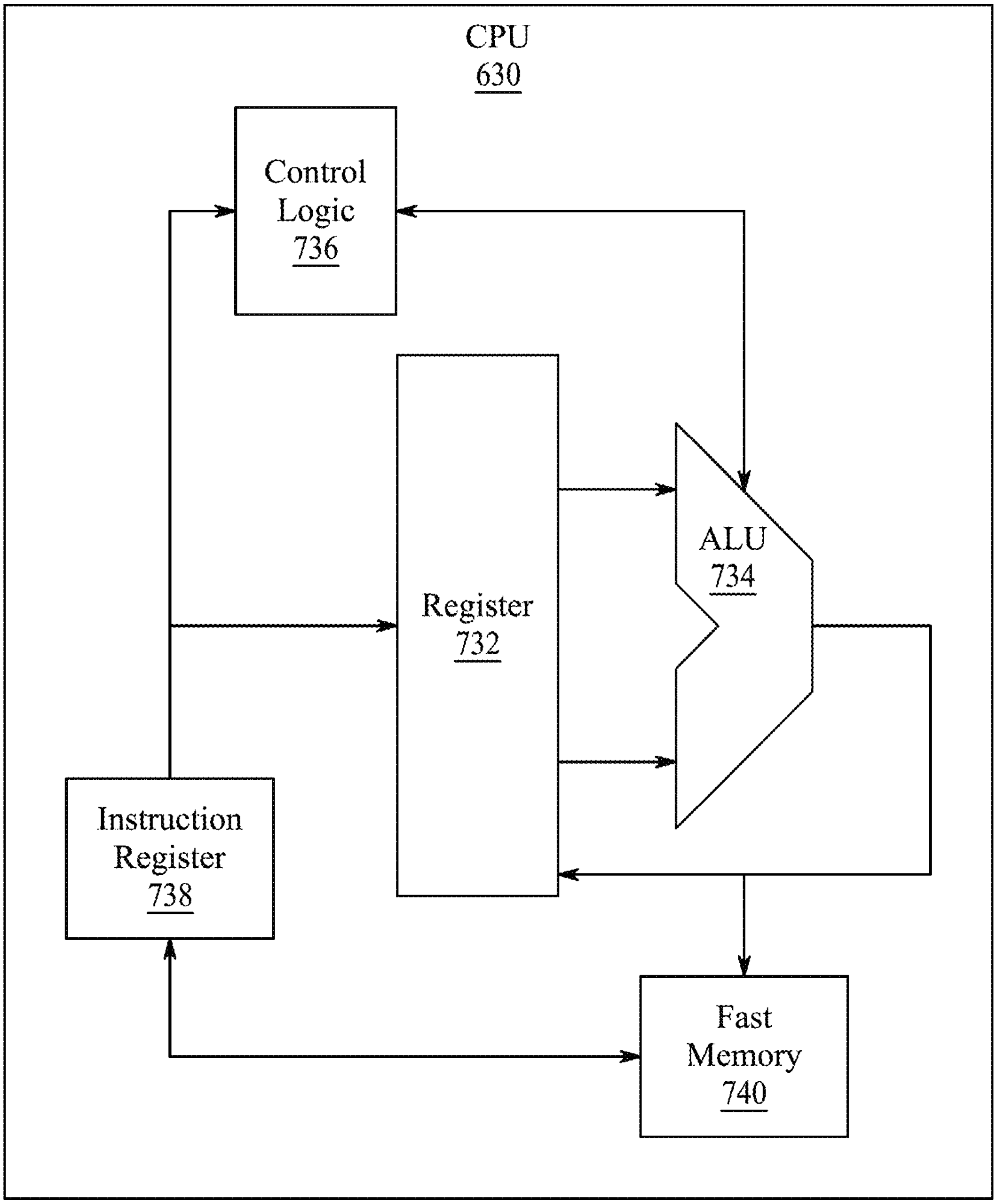
FIG. 7 is an exemplary schematic diagram of a processor used with the computing system, according to certain embodiments.

For example, FIG. 7 shows one implementation of CPU 630. In one implementation, the instruction register 738 retrieves instructions from the fast memory 740. At least part of these instructions are fetched from the instruction register 738 by the control logic 736 and interpreted according to the instruction set architecture of the CPU 630. Part of the instructions can also be directed to the register 732. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 734 that loads values from the register 732 and performs logical and mathematical operations on the loaded values according to the instructions. The results from these operations can be feedback into the register and/or stored in the fast memory 740. According to certain implementations, the instruction set architecture of the CPU 630 can use a reduced instruction set architecture, a complex instruction set architecture, a vector processor architecture, a very large instruction word architecture. Furthermore, the CPU 630 can be based on the Von Neuman model or the Harvard model. The CPU 630 can be a digital signal processor, an FPGA, an ASIC, a PLA, a PLD, or a CPLD. Further, the CPU 630 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 6, the data processing system 600 can include that the SB/ICH 620 is coupled through a system bus to an I/O Bus, a read only memory (ROM) 656, universal serial bus (USB) port 664, a flash binary input/output system (BIOS) 668, and a graphics controller 658. PCI/PCIe devices can also be coupled to SB/ICH 688 through a PCI bus 662.

The PCI devices may include, for example, Ethernet adapters, add-in cards, and PC cards for notebook computers. The Hard disk drive 660 and CD-ROM 666 can use, for example, an integrated drive electronics (IDE) or serial advanced technology attachment (SATA) interface. In one implementation the I/O bus can include a super I/O (SIO) device.

Further, the hard disk drive (HDD) 660 and optical drive 666 can also be coupled to the SB/ICH 620 through a system bus. In one implementation, a keyboard 670, a mouse 672, a parallel port 678, and a serial port 676 can be connected to the system bus through the I/O bus. Other peripherals and devices that can be connected to the SB/ICH 620 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 8:
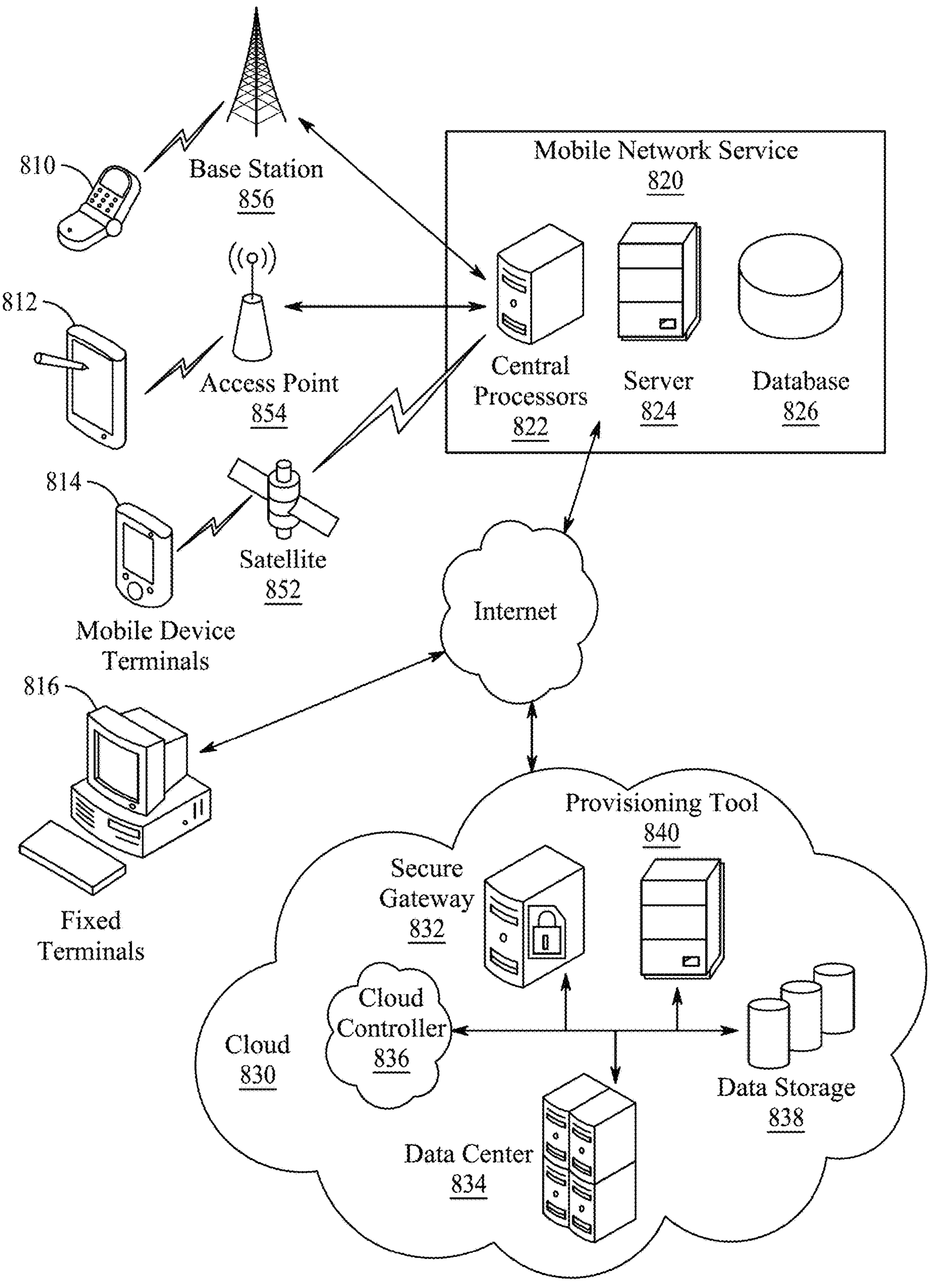
FIG. 8 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, such as cloud 830 including a cloud controller 836, a secure gateway 832, a data center 834, data storage 838 and a provisioning tool 840, and mobile network services 820 including central processors 822, a server 824 and a database 826, which may share processing, as shown by FIG. 8, in addition to various human interface and communication devices (e.g., display monitors 816, smart phones 810, tablets 812, personal digital assistants (PDAs) 814). The network may be a private network, such as a LAN, satellite 852 or WAN 854, or be a public network, may such as the Internet. Input to the system may be received via direct user input and received remotely either in real-time or as a batch process. Additionally, some implementations may be performed on modules or hardware not identical to those described. Accordingly, other implementations are within the scope that may be claimed.

While specific embodiments of the invention have been described, it should be understood that various modifications and alternatives may be implemented without departing from the spirit and scope of the invention. For example, different cellular automata rules or encryption algorithms could be employed, or alternative feature extraction and face recognition techniques could be integrated into the system.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. An energy generating speed bump assembly, comprising:

a housing including a top surface, a bottom surface, a first wall, a second wall opposite the first wall, a third wall connected to the first wall and the second wall, wherein the third wall is perpendicular to the first wall, and a fourth wall connected to the first wall and the second wall and opposite to the third wall, wherein the housing includes three sections configured as an upper section adjoining the top surface, a middle section below the upper section and a lower section below the middle section, wherein the housing is mounted within a trench in a roadway;

a speed bump having a tapered side surface, a flat bottom surface, an arcuate top surface and an arcuate side surface, wherein the arcuate top surface is configured to extend from an upper end of the tapered side surface to the arcuate side surface, and the arcuate side surface is configured to extend from the arcuate top surface to the flat bottom surface;

a channel located within the housing, the channel having an opening configured to receive the flat bottom surface, the tapered side surface and the arcuate side surface of the speed bump, wherein the channel has a lower surface and tapered sides, wherein an angle of a first tapered side of the channel is configured to match an angle of the tapered side surface of the speed bump;

a spring having a top end mounted to the flat bottom surface of the speed bump, wherein the spring is configured to coil in response to a depression of the speed bump into the channel and to uncoil and return the speed bump to an undepressed configuration in which the arcuate top surface of the speed bump extends above a surface of the roadway;

a piston oil pump including a cylinder, a piston rod and a piston head configured to move within the cylinder, wherein a first end of the piston rod is mounted to the flat bottom surface of the speed bump and a second end of the piston rod is connected to the piston head, wherein a bottom end of the spring is mounted to an indented ring on an outside surface of the piston head;

a main oil reservoir connected to piston oil pump, wherein oil in the main oil reservoir is at atmospheric pressure, wherein the piston oil pump is configured to pump oil from the cylinder into the main oil reservoir when the piston head is depressed by the speed bump and withdraw oil from the main oil reservoir when the spring uncoils and returns the speed bump to the undepressed configuration;

a compressed oil tank connected to the main oil reservoir and to the piston oil pump, wherein the compressed oil tank is configured to receive oil from the main oil reservoir when the piston head is depressed within the piston oil pump;

an oil turbine connected to the compressed oil tank, wherein the oil turbine is configured receive a stream of compressed oil when the piston head is depressed within the piston oil pump, wherein the stream of compressed oil is configured to rotate a turbine shaft of the oil turbine; and an electrical generator connected to the turbine shaft, wherein the electrical generator is configured to generate electricity when the turbine shaft is rotated by the stream of compressed oil.

2. The energy generating speed bump assembly of claim 1, further comprising vertical guide rails configured to surround the piston oil pump and prevent lateral displacement of the piston head within the cylinder.

3. The energy generating speed bump assembly of claim 1, wherein the spring is a helical compression spring configured to encircle the piston rod, wherein the spring is seated between a cylinder top and the flat bottom surface of the speed bump.

4. The energy generating speed bump assembly of claim 3, wherein the helical compression spring is about 0.2 m in height.

5. The energy generating speed bump assembly of claim 1, further comprising:

a steel mounting plate located on the flat bottom surface of the speed bump;

a U-shaped bracket connected to the steel mounting plate, wherein the first end of the piston rod is connected to the U-shaped bracket.

6. The energy generating speed bump assembly of claim 1, further comprising:

a cylinder mounting bracket attached by bolts to a bottom surface of the upper section, wherein the cylinder mounting bracket is configured to hold a base of the cylinder to the bottom surface of the upper section; and a plurality of rubber damping pads placed between the base of the cylinder and the cylinder mounting bracket, wherein the plurality of rubber damping pads are configured to absorb vibrations and prevent mechanical wear of the cylinder.

7. The energy generating speed bump assembly of claim 1, wherein a top of the channel is configured to align with a top edge of the trench in the roadway.

8. The energy generating speed bump assembly of claim 1, wherein the trench in the roadway is lined with reinforced concrete configured to support the channel and prevent deformation of the trench under heavy loads.

9. The energy generating speed bump assembly of claim 8, wherein the housing is mounted within the trench by anchors bolted to the reinforced concrete.

10. The energy generating speed bump assembly of claim 1, wherein the trench has a length in a range of about 2.5 m to about 3.7 m, a width in a range of about 1.65 m to 2.0 m and a depth in a range of about 0.95 m to about 1 m.

11. The energy generating speed bump assembly of claim 1, further comprising a wiring harness connected to the generator, wherein the wiring harness is connected to an outlet terminal located on one of the first wall and the second wall of the housing near the top surface of the housing.

12. The energy generating speed bump assembly of claim 1, wherein the top surface of the housing includes a lip around an outer edge of the top surface, wherein the lip includes bolt holes configured to receive anchor bolts which secure the housing to a surface of the roadway.

13. The energy generating speed bump assembly of claim 1, wherein the housing includes a first access plate located on the top surface, wherein the first access plate is configured to provide access to the middle section, and a second access plate located on a bottom surface of the middle section, wherein the second access plate is configured to provide access to the turbine and the generator.

14. The energy generating speed bump assembly of claim 1, further comprising an air pipe connected to an air vent located at a top surface of the main oil reservoir, wherein the air pipe is configured to eject air from the main oil reservoir when the piston oil pump pumps oil into the main oil reservoir and draw air into the main oil reservoir through the air pipe when the piston of the piston oil pump is pulled upward by the uncoiling of the helical compression spring.

15. The energy generating speed bump assembly of claim 14, wherein the compressed oil is returned to the main oil reservoir after passing through the oil turbine.

* * * * *